United States Patent
Fields et al.

(10) Patent No.: US 11,400,834 B2
(45) Date of Patent: *Aug. 2, 2022

(54) ADJUSTING INTERIOR CONFIGURATION OF A VEHICLE BASED ON EXTERNAL ENVIRONMENT DATA

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US); Scott T. Christensen, Salem, OR (US); Stephen R. Prevatt, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/887,307

(22) Filed: Feb. 2, 2018

(65) Prior Publication Data

US 2021/0309124 A1 Oct. 7, 2021

(51) Int. Cl.
*B60N 2/02* (2006.01)
*B60W 30/095* (2012.01)
*B60N 2/04* (2006.01)

(52) U.S. Cl.
CPC ............ *B60N 2/0276* (2013.01); *B60N 2/04* (2013.01); *B60W 30/0953* (2013.01); *B60W 30/0956* (2013.01); *B60N 2205/20* (2013.01); *B60W 2554/00* (2020.02); *B60W 2555/20* (2020.02)

(58) Field of Classification Search
None
See application file for complete search history.

(56) References Cited

U.S. PATENT DOCUMENTS

| | | |
|---|---|---|
| 3,040,925 A | 6/1962 | Mills |
| 4,252,340 A | 2/1981 | Egging |
| 4,518,183 A | 5/1985 | Lee |
| 4,836,080 A | 6/1989 | Kite, III et al. |
| | (Continued) | |

FOREIGN PATENT DOCUMENTS

| | | | |
|---|---|---|---|
| CN | 106043076 A | 10/2016 | |
| DE | 102014203138 A1 * | 10/2015 | ........... G08G 1/0962 |

*Primary Examiner* — Kevin P Mahne
*Assistant Examiner* — Hongye Liang
(74) *Attorney, Agent, or Firm* — Marshall, Gerstein & Borun LLP

(57) ABSTRACT

A system and method are provided for controlling an interior configuration of a vehicle. The system may include an interior vehicle component, an actuator component configured to adjust a physical configuration of the interior vehicle component, an external communication component configured to collect driving environment data representing an external environment of the vehicle, and one or more processors configured to receive driving environment data and detect, by processing the driving environment data, an external driving condition. When the one or more processors detect the external driving condition, the one or more processors may cause the actuator component to adjust the interior vehicle component from a first physical configuration to a second physical configuration, or may cause the actuator component to restrict movement of the interior vehicle component to a predetermined range of physical configurations.

26 Claims, 11 Drawing Sheets

(56) References Cited

U.S. PATENT DOCUMENTS

| | | | |
|---|---|---|---|
| 5,570,903 | A | 11/1996 | Meister et al. |
| 5,748,477 | A | 5/1998 | Katoh |
| 5,785,347 | A | 7/1998 | Adolph et al. |
| 5,975,231 | A | 11/1999 | Hirato |
| 6,026,340 | A | 2/2000 | Corrado et al. |
| 6,490,515 | B1 | 12/2002 | Okamura et al. |
| 7,158,016 | B2 | 1/2007 | Cuddihy et al. |
| 7,178,622 | B2 | 2/2007 | Eberle et al. |
| 7,798,275 | B2 | 9/2010 | Fehring et al. |
| 8,157,045 | B2 * | 4/2012 | Hashimoto ........... B60N 2/0232 180/268 |
| 8,260,502 | B2 | 9/2012 | Yonak et al. |
| 9,199,563 | B2 | 12/2015 | Howard et al. |
| 9,663,052 | B2 | 5/2017 | Rao et al. |
| 9,886,841 | B1 | 2/2018 | Nave et al. |
| 10,300,832 | B1 | 5/2019 | Folks et al. |
| 10,324,463 | B1 | 6/2019 | Konrardy et al. |
| 10,437,232 | B2 | 10/2019 | Langer et al. |
| 2002/0003345 | A1 | 1/2002 | Stanley et al. |
| 2002/0188393 | A1 | 12/2002 | Yokota et al. |
| 2004/0049331 | A1 | 3/2004 | Schneider |
| 2004/0107033 | A1 | 6/2004 | Rao et al. |
| 2005/0069839 | A1 | 3/2005 | Denne |
| 2005/0082851 | A1 | 4/2005 | Nakanishi |
| 2005/0131606 | A1 | 6/2005 | Motozawa et al. |
| 2005/0240329 | A1 * | 10/2005 | Hirota ................. B60N 2/4279 701/41 |
| 2006/0186702 | A1 | 8/2006 | Kisanuki et al. |
| 2007/0083311 | A1 | 4/2007 | Tabe |
| 2007/0107969 | A1 * | 5/2007 | Ootani ................ B60R 22/4604 296/68.1 |
| 2007/0223910 | A1 | 9/2007 | Aoki et al. |
| 2008/0040004 | A1 * | 2/2008 | Breed ................... G01S 7/0234 701/45 |
| 2008/0162002 | A1 | 7/2008 | Bacher et al. |
| 2009/0143943 | A1 | 6/2009 | Jaramillo et al. |
| 2009/0152041 | A1 | 6/2009 | Kim |
| 2009/0152880 | A1 | 6/2009 | Donovan |
| 2009/0242308 | A1 | 10/2009 | Kitte et al. |
| 2009/0326766 | A1 | 12/2009 | Wang |
| 2010/0066116 | A1 | 3/2010 | Coenen |
| 2011/0140404 | A1 | 6/2011 | Odate |
| 2011/0172882 | A1 | 7/2011 | Schrader |
| 2011/0221247 | A1 | 9/2011 | Hashimoto et al. |
| 2011/0295467 | A1 | 12/2011 | Browne et al. |
| 2012/0166229 | A1 | 6/2012 | Collins et al. |
| 2012/0215403 | A1 | 8/2012 | Tengler et al. |
| 2014/0135598 | A1 | 5/2014 | Weidl et al. |
| 2014/0309790 | A1 | 10/2014 | Ricci |
| 2014/0339391 | A1 * | 11/2014 | Hsu ....................... A61G 5/046 248/371 |
| 2015/0224845 | A1 | 8/2015 | Anderson et al. |
| 2015/0375756 | A1 * | 12/2015 | Do ....................... G07C 5/0808 701/1 |
| 2016/0277911 | A1 * | 9/2016 | Kang ................... H04B 1/3822 |
| 2016/0297430 | A1 | 10/2016 | Jones et al. |
| 2017/0182970 | A1 | 6/2017 | Wu |
| 2017/0313208 | A1 | 11/2017 | Lindsay |
| 2018/0094966 | A1 | 4/2018 | Buether |
| 2018/0164119 | A1 * | 6/2018 | Becker ................... G01W 1/06 |
| 2018/0272977 | A1 | 9/2018 | Szawarski et al. |
| 2018/0281625 | A1 * | 10/2018 | Akaba ................. B60N 2/0276 |
| 2018/0368191 | A1 * | 12/2018 | Vutukuri ............... H04W 76/14 |
| 2019/0023209 | A1 | 1/2019 | Freienstein et al. |
| 2019/0095877 | A1 * | 3/2019 | Li ......................... G06N 3/0454 |
| 2019/0096256 | A1 * | 3/2019 | Rowell ................... G01S 15/66 |
| 2019/0103026 | A1 * | 4/2019 | Liu ......................... G06V 10/25 |

* cited by examiner

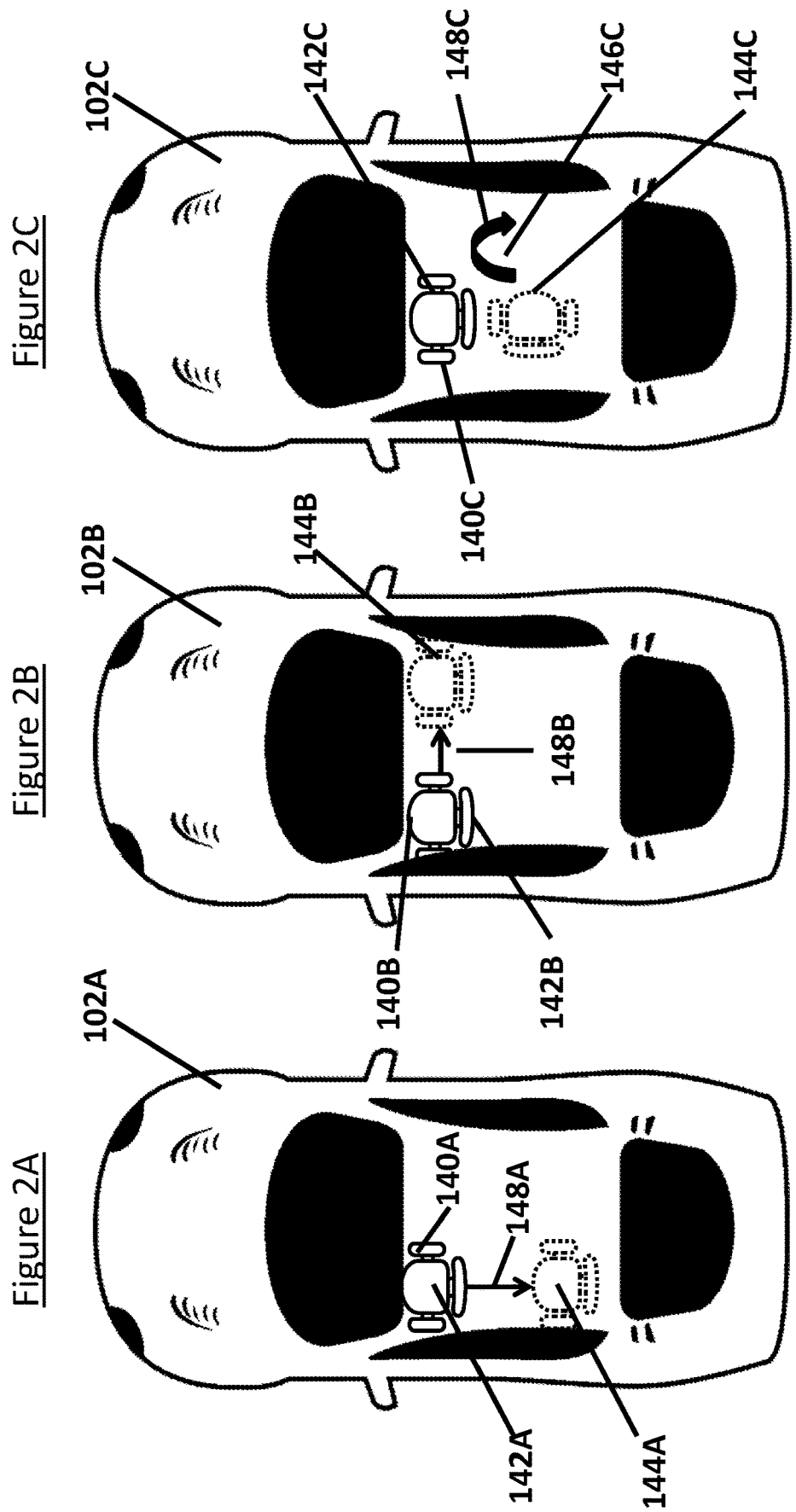

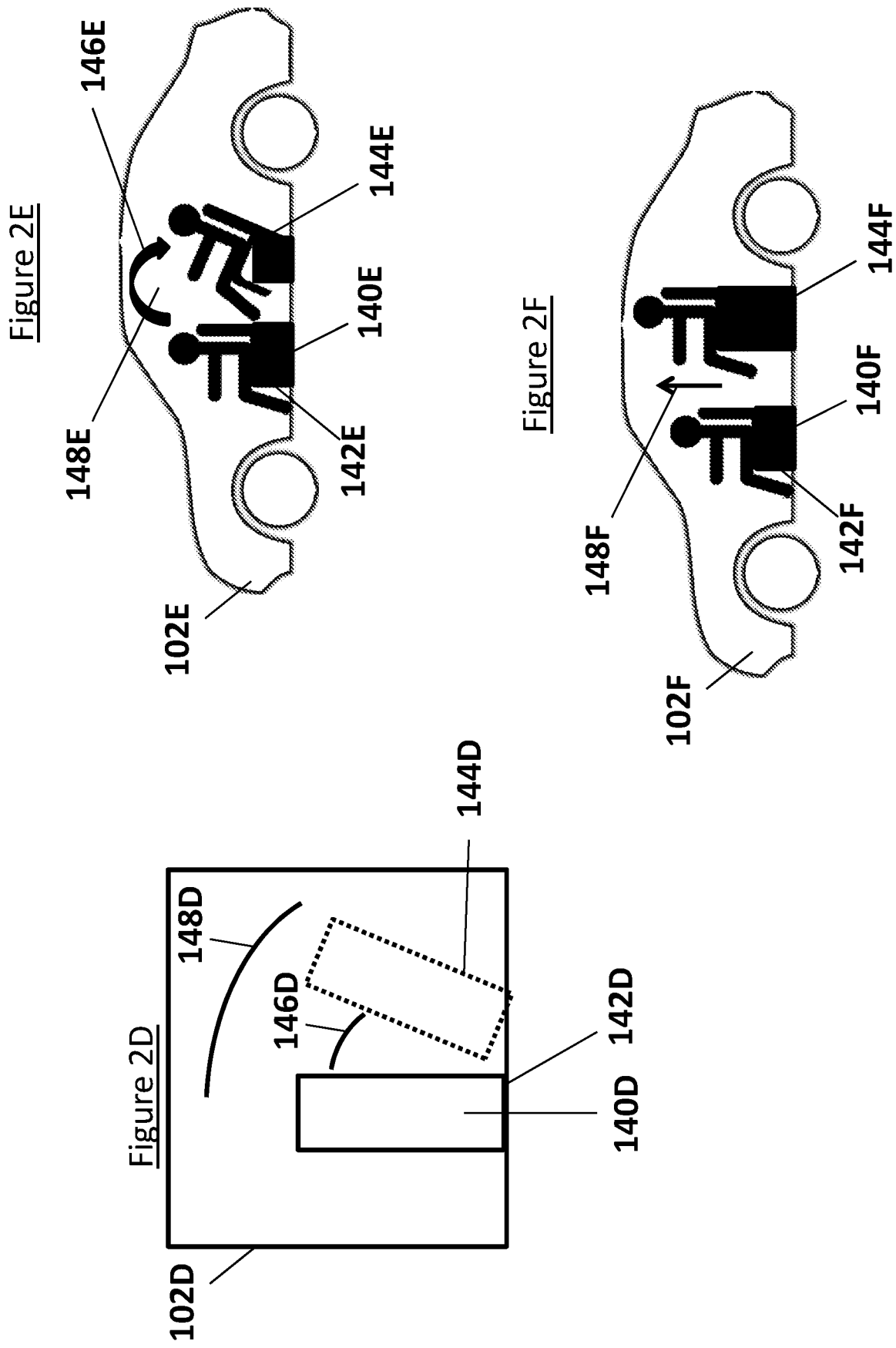

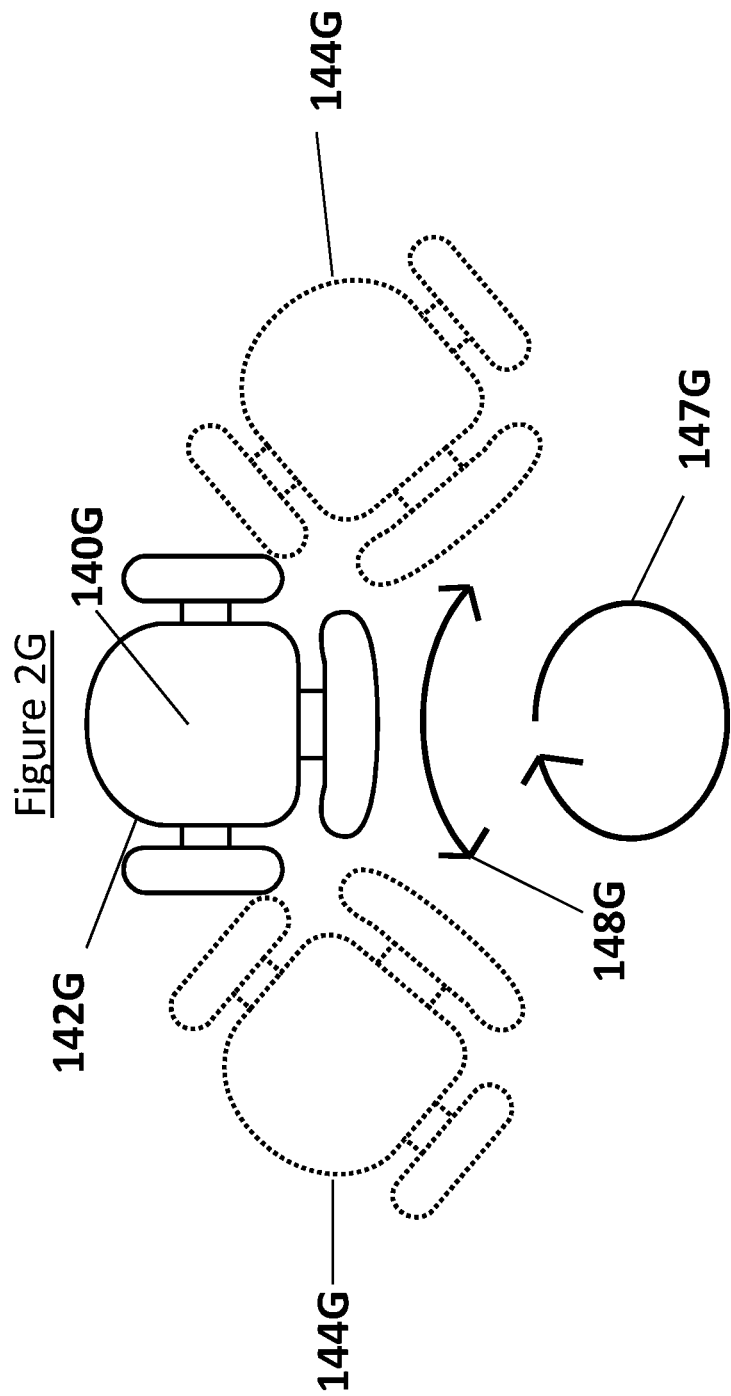

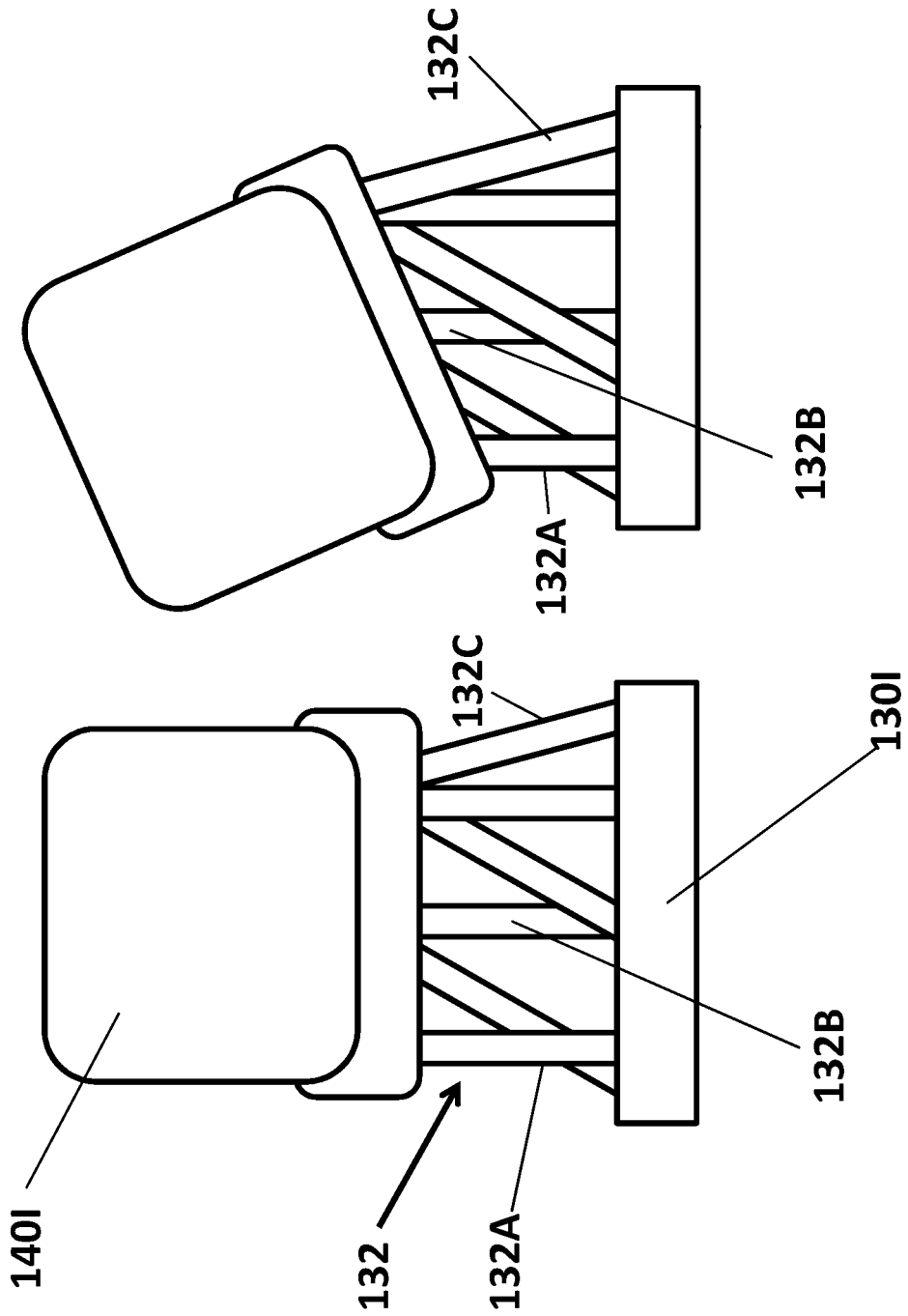

ADJUSTING INTERIOR CONFIGURATION OF A VEHICLE BASED ON EXTERNAL ENVIRONMENT DATA

FIELD OF DISCLOSURE

The present disclosure generally relates to vehicle safety. More particularly, the present invention disclosure relates to systems and methods for modifying and controlling the interior configuration of a vehicle, in response to detecting an external driving condition and/or detecting the vehicle has taken a specific action, for the purpose of improving vehicle passenger safety and reducing injury risk.

BACKGROUND

The interior configuration and layout of a vehicle has changed only incrementally since the invention of automobiles over a century ago. Conventional interior vehicle configurations were adapted so that a human could effectively and safely, and manually, operate a vehicle. Accordingly, existing interior vehicle configurations are confined to certain layouts to accommodate these requirements. For instance, space in the vehicle must be devoted to the steering wheel, brake, accelerator, and gear shifter, and the driver must be positioned to accessibly operate this equipment while having a clear view of the road and traffic in all directions. Additionally, user interface control panels must also be arranged to conform to this layout. In existing vehicles, a vehicle operator has no way to adjust his/her physical position without abandoning the vehicle controls, thereby increasing the likelihood of an accident. Therefore, a driver and/or passenger is seemingly limited to a certain position regardless of driving conditions and/or the vehicle's actions, which in turn can place detrimental force and strain on the vehicle driver and/or passenger's body.

Existing vehicle safety technology has been limited in form and/or function in order to also conform to existing configurations. Each year millions of individuals are injured as a result of vehicular accidents emanating from operator error, inattention, inexperience, misuse, or distraction; inclement weather conditions; treacherous road conditions; and other driving environment conditions. While existing vehicle safety technologies have improved vehicle driver and passenger safety, many of these technologies, such as airbags, do not deploy until after a vehicle has already been involved in a collision. Similarly, other existing vehicle safety technologies, such as seatbelts, can only perform a single function and provide limited or no benefit in certain situations. In some instances, the existing safety technology installed in a vehicle can cause more harm than it prevents because of the specific type of accident and/or the physical attributes of the vehicle's passenger. A passenger's specific body position during a collision can affect how his/her body is impacted by the collision, and just a few inches or degrees of difference in body positioning can be the difference between a passenger walking away from a collision alive and unscathed, as opposed to life-altering injuries or death. However, given the near-instantaneous nature of most accidents, it is almost impossible for a driver or passenger to brace for impact or make changes to his/her position to reduce a risk of injury. Even if a passenger was somehow able to foresee an impending accident, his/her physical movement would be limited due to the existing and confined standard interior vehicle configurations. Additionally, it would often be impossible for a human passenger to determine, especially in an instant, what precise movements needed to be made to avoid/reduce injury, make such movements, and/or verify such movements had been accurately taken.

The increase in autonomous and semi-autonomous vehicles has decreased the need for vehicles to be operated by humans. Autonomous and semi-autonomous vehicles augment vehicle operators' information or replace vehicle operators' control commands to operate the vehicle, in whole or part, with computer systems based upon information collected by equipment within, or attached to, the vehicle. Consequently, there is a decreased need for vehicles to be confined to features and configurations, such as the interior layout, specifically designed to accommodate human-operated vehicles.

SUMMARY

The present application disclosure provides a system and method for modifying the physical configuration of an interior component of a vehicle in response to detecting an external driving condition, and/or in response to detecting the vehicle taking a specific action.

In one embodiment, a system for controlling an interior configuration of a vehicle includes an interior vehicle component, an actuator component configured to adjust a physical configuration of the interior vehicle component, and an external communication component configured to collect data representing an external environment of the vehicle. The system also includes one or more processors configured to receive driving environment data. The driving environment data includes, or is derived from data that includes, the data collected by the external communication component. The one or more processors are also configured to detect, by processing the driving environment data, an external driving condition, and, when the one or more processors detect the external driving condition, cause the actuator component to adjust the interior vehicle component from a first physical configuration to a second physical configuration.

In one embodiment, a method for controlling an interior configuration of a vehicle comprises receiving, via one or more processors, driving environment data; detecting, via the one or more processors, an external driving condition based on the received driving environment data; and causing, via an actuator component, an interior vehicle component to adjust from a first physical configuration to a second physical configuration when the one or more processors detect the external driving condition.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 2A illustrates a first embodiment in which an interior vehicle component may be adjusted from a first physical configuration to a second physical configuration.

FIG. 2B illustrates a second embodiment in which an interior vehicle component may be adjusted from a first physical configuration to a second physical configuration.

FIG. 2C illustrates a third embodiment in which an interior vehicle component may be adjusted from a first physical configuration to a second physical configuration.

FIG. 2D illustrates a fourth embodiment in which an interior vehicle component may be adjusted from a first physical configuration to a second physical configuration.

FIG. 2E illustrates a fifth embodiment in which an interior vehicle component may be adjusted from a first physical configuration to a second physical configuration.

FIG. 2F illustrates a sixth embodiment in which an interior vehicle component may be adjusted from a first physical configuration to a second physical configuration.

FIG. 2G illustrates an embodiment in which movement of an interior vehicle component may be restricted.

FIG. 2I illustrates an embodiment in which an interior vehicle component may be adjusted using a Stewart strut system.

DETAILED DESCRIPTION

The embodiments described herein relate to, inter alia, systems and methods for adjusting the physical configuration, or restricting the movement, of one or more interior components of a vehicle in response to detecting an external driving condition affecting the vehicle and/or detecting the vehicle taking a specific action.

Figure 1A:
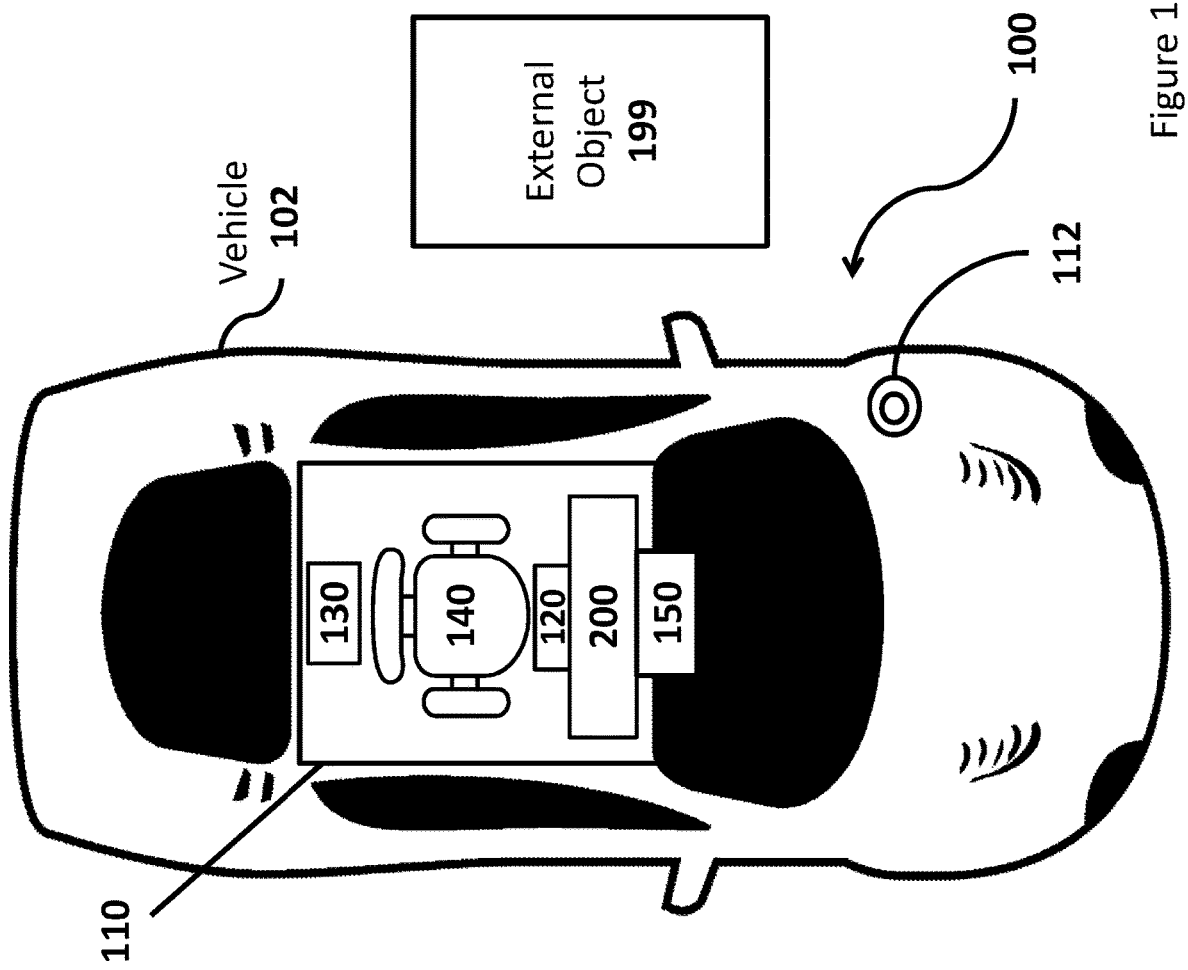
FIG. 1A depicts a block diagram of a first embodiment of a system for controlling an interior vehicle component.

FIG. 1A depicts a block diagram of a first embodiment of a system 100 for controlling an interior vehicle component. The system 100 includes a vehicle 102, vehicle-based components 110, and one or more objects external to the vehicle 199 (hereinafter "external object 199"). The vehicle-based components 110 may include an external communication component 112, a vehicle computer 200, an interior data collection component 120, an actuator component 130, an interior vehicle component 140, and a vehicle operation controller 150. In operation, data relating to a vehicle's surrounding environment and/or operation is collected and transmitted to the vehicle computer 200. The vehicle computer 200 analyzes this data to detect an external driving condition and/or whether the vehicle 102 has taken a specific action. When the vehicle computer 200 detects the external driving condition and/or the specific action, the vehicle computer 200 causes the actuator component 130 to adjust the movement of the interior vehicle component 140 from a first physical configuration to a second physical configuration, or to restrict the movement of the interior vehicle component 140.

Although the system 100 is shown in FIG. 1A to include one vehicle 102, one external communication component 112, one interior data collection component 120, one actuator component 130, one interior vehicle component 140, one vehicle operation controller 150, one adjacent object 199, and one vehicle computer 200, it should be understood that different numbers of each may be utilized. For example, the system 100 may include a plurality of external communication components 112, all of which may be coupled to the vehicle 102 and in communication with the vehicle computer 200. Furthermore, the storage or processing performed by the vehicle 200 may be distributed among a plurality of computers comprising a network.

The vehicle 102 may be an automobile, bus, motorcycle, boat, airplane, train, helicopter, tractor, jet ski, forklift, or other machine employed by a user to travel, and may be an autonomous vehicle, a semi-autonomous vehicle, or a fully manual vehicle.

The external communication component 112 is configured to collect driving environment data representative of an external environment of the vehicle 102. An external environment is the physical environment and/or space outside of the vehicle 102. The external communication component 112 may be affixed on, to, and/or in the vehicle 102. The external communication component 112 may include one or more of transceivers, GPS units, sensors (e.g., a radar unit, LIDAR unit, motion sensor, ultrasonic sensor, infrared sensor, inductance sensor, camera, microphone, etc.), and/or any other suitable piece(s) of equipment configured to collect data representative of the external environment to the vehicle 102. In some embodiments where the external communication component 112 includes a transceiver, driving environment data may be received using wireless communication technology, such as Bluetooth, Wi-Fi, dedicated short-range communications (DSRC), or other existing or later-developed communications protocols. For those embodiments in which the external communication component 112 includes a sensor, the external communication component 112 may actively or passively scan the external environment of the vehicle for one or more external objects 199.

In some embodiments the external communication component 112 is a microphone configured to recognizing external audio input, commands, and/or sounds of windows breaking, air bags deploying, tires skidding, conversations or voices of other drivers and/or pedestrians, music, rain, snow, or wind noise, and/or other sounds heard external to the vehicle 102 that would enable the processor 202 to detect an external driving condition.

Examples of the external object 199 include, but are not limited to, one or more other vehicles, buildings, pedestrians, roadways, lane markings, traffic signs, shrubbery, structures, animals, and/or any other physical element that could come into physical contact with the vehicle 102 and be involved in an accident/crash/collision. In some embodiments, the external communication component 112 may collect data for determining the location, position, movement, speed, route, destination, and/or trajectory of external object 199. The external communication component 112 may also be configured to collect, receive, transmit, and/or generate data relating to current, future, and/or past driving conditions, weather conditions, traffic conditions, road integrity, terrain conditions, construction, past/typical driving behavior of an adjacent vehicle, the external object 199, and/or the environment external to the vehicle 102. Data collected, received, or generated by the external communication component 112 may be transmitted to the vehicle computer 200, or a component of the vehicle computer 200.

In some embodiments, the external communication component 112 may include a transceiver configured to receive third party driving environment data from the external object 199, a server, a network, an infrastructure component, and/or another source. The infrastructure components may include smart infrastructure or devices (e.g., sensors, transmitters, etc.) disposed within or communicatively connected to buildings, transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. Examples of other sources that may transmit driving environment data to the external communication component 112 include mobile devices (e.g. smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; buildings; pedestrians; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication. In some embodiments, the driving environment data collected may be derived from police or fire departments, hospitals, and/or emergency responder communications; police reports; municipality information; automated Freedom of Information Act requests; and/or other data collected from government agencies and officials.

In some embodiments, if a driver has expressly agreed to participate in a program involving data collection/sharing, the external communication component 112 may also transmit the collected driving environment data to a third party receiver, database, server, infrastructure component, and/or network. In some embodiments, the collected driving environment data may be used to adjust, generate, and/or update an insurance policy, premium, rate, discount, and/or reward for the specific driver, passenger, and/or the insured individual. The external communication component 112 may be originally installed by a manufacturer of the vehicle 102, or installed as an aftermarket modification or addition to the vehicle 102.

The external communication component 112 may include a clock configured to time-stamp the date and time that driving environment data is collected by the external communication component 112.

The physical configuration of the interior vehicle component 140 may be adjusted/restricted based on the actions and/or performance of the vehicle 102. For such embodiments, vehicle operation data, corresponding to the vehicle and/or its performance, is analyzed by the processor 202 to determine whether the vehicle 102 has taken a specific action. Examples of vehicle operation data include, but are not limited to, data corresponding to the speed, position, location, and/or any other performance related parameter of the vehicle 102 and/or one of its components or subsystems. Vehicle operation data may be derived from or otherwise indicative of the vehicle control data, which may be generated by the vehicle controller 150 and/or one of its subsystems.

The vehicle operation controller 150 is configured to control the operation of the vehicle 102 and its components, and also, in some embodiments, to generate data corresponding to that operation for use by the vehicle computer 200. In some embodiments, the vehicle operation controller 150 may be an autonomous vehicle controller that executes driving decisions or a system that controls the operations of the vehicle 102 based on manual inputs from a driver. The vehicle operation controller 150 may include hardware, firmware and/or software subsystems that control (and possibly monitor) the various operational parameters of the vehicle 102. The vehicle operation controller 150 may be configured to generate and transmit vehicle control data, indicative of the driving decision, to operate the vehicle 102 or one of its subsystems. For example, the vehicle operation controller 150 may transmit vehicle control data to a braking subsystem to control how the brakes of vehicle 102 are applied (e.g., an absolute or relative measure of applied braking force, or a binary indicator of whether the brakes are being applied at all, etc.), a speed subsystem to control how fast the vehicle 102 is being driven (e.g., corresponding to a speedometer reading, an accelerometer measurement, and/or a driver input such as depression of a gas pedal, etc.), and/or a steering subsystem to control how the vehicle 102 is being steered (e.g., based upon the driver's manipulation of a steering wheel, or based upon automated steering control data, etc.). The vehicle operation controller 150 may also include a diagnostics subsystem that generates other information pertaining to the operation of vehicle 102, such as warning/alert information to indicate that one or more components of vehicle 102 is/are in need of replacement, an upgrade, and/or servicing.

In some embodiments, the vehicle operation controller 150 sends vehicle operation data (e.g., the raw vehicle control data discussed above, or other data indicative of the vehicle control data) to the vehicle computer 200. For example, to apply the brakes, the vehicle operation controller 150 may generate a command to apply the brakes, and transmit this command not only to a braking subsystem but also to the vehicle computer 200. As another example, the vehicle operation controller 150 may generate a command to apply the brakes, and also generate a message, for the vehicle computer 200, indicating that such a command was sent to the braking subsystem. In either embodiment, the vehicle computer 200 may then process the command or message to determine whether the vehicle 102 has taken a specific action. The vehicle operation controller 150 may be designed to transmit data to the vehicle computer 200 according to predetermined specifications, such as a dedicated short-range communication (DSRC) channel, wireless telephony, Wi-Fi, or other existing or later-developed communications protocols.

In other embodiments, a sensing component (such as an accelerometer, tachometer, speedometer, etc.) may generate vehicle operation data based on the sensed operation of the vehicle 102. In such embodiments, these sensors (or related systems) may transmit the vehicle operation data to the vehicle computer 200. In embodiments utilizing a sensing component, the sensing component may be part of the vehicle operation controller 150, a different component of vehicle-based component 110, and/or a separate device (such as a mobile phone) in wired or wireless communication with the vehicle computer 200. The vehicle operation data may include raw sensor data and/or may be preprocessed by the sensing component (or another component) prior to being received as vehicle operation data by the vehicle computer 200. For example, the sensing component may generate vehicle operation data by sensing the positive, negative, and/or lateral acceleration of the vehicle 102, or by sensing the rate at which the wheels are rotating, etc.

Figure 1B:
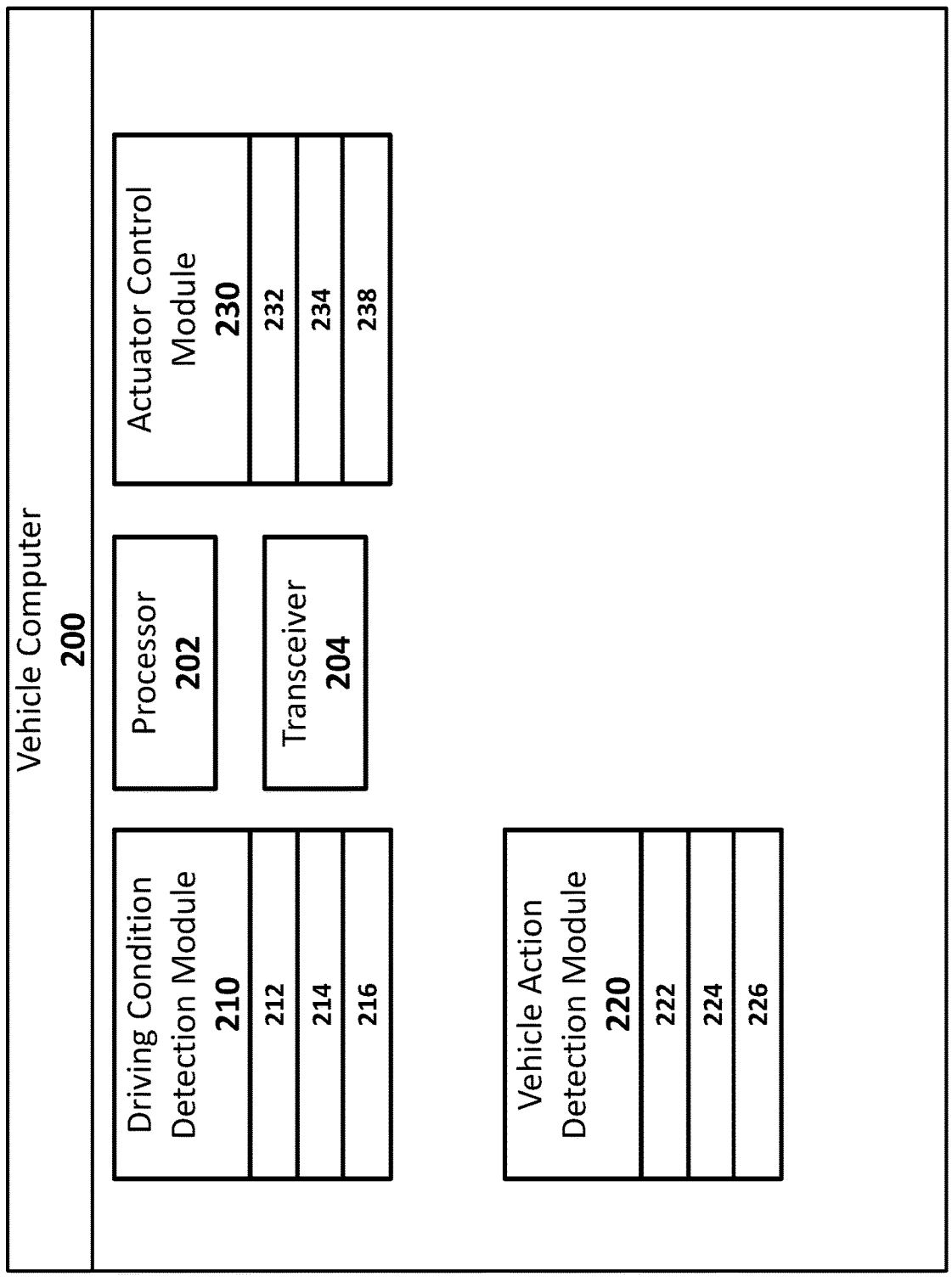
FIG. 1B is a detail block diagram of a vehicle computer that may be used in the system of FIG. 1A.

FIG. 1B depicts a detailed block diagram of the vehicle computer 200, according to one embodiment. The vehicle computer 200 is configured to receive, transmit, process, analyze, and/or detect data relating to the vehicle 102 and its environment, and monitor/control various features, functions, and components of the vehicle 102. The vehicle computer 200 may comprise one or more processors 202, a transceiver 204, a driving condition detection module 210, a vehicle action detection module 220, and an actuator control module 230. The vehicle computer 200 may be originally installed by a manufacturer of the vehicle 102, or installed as an aftermarket modification or addition to the vehicle 102. The vehicle computer 200 may be configured to be in communication with the external communication component 112, the interior data collection component 120, the actuator component 130, and/or the vehicle operation controller 150 of FIG. 1A. The transceiver 204 is configured to receive and transmit data, and may be designed to send and receive information/data according to predetermined specifications, such as a dedicated short-range communication (DSRC) channel, wireless telephony, Wi-Fi, or other existing or later-developed communications protocols. The vehicle computer 200 may include a user interface for a passenger to view, enter, and/or select information pertaining to his/herself, another passenger, the vehicle 102, the interior configuration of the vehicle 102, and/or the environment external to vehicle 102.

The vehicle computer 200 may further include a number of software applications stored in in the program memory of the driving condition detection module 210, the vehicle action detection module 220, and/or the actuator control module 230. In some embodiments the aforementioned modules may all be stored as software modules within the same program memory. The various software applications on the vehicle computer 200 may include specific programs, routines, or scripts for performing processing functions associated with the methods and functions described herein. Additionally, the various software applications on the vehicle computer 200 may include general-purpose software applications for data processing, database management, data analysis, network communication, web server operation, or other functions described herein or typically performed by a server. The various software applications may be executed on the same processor 202 or on different processors. Additionally, or alternatively, the software applications may interact with various hardware modules that may be installed within or connected to the vehicle 200. Such modules may implement part of all of the various exemplary methods discussed herein or other related embodiments. The memory units discussed herein may include one or more types of memory, including volatile memory (e.g., DRAM, SRAM, etc.), non-volatile memory (ROM, EEPROM, etc.), and/or secondary storage (e.g., hard drive, solid state, etc.).

The driving condition detection module 210 is configured to receive, store, and analyze the driving environment data to determine whether an external driving condition has been detected. Examples of an external driving condition which the processor 202 may be configured to detect include, but are not limited to, an impending automobile accident, a nearby automobile accident that involves one or more other vehicles and has already occurred, a weather condition, a traffic condition, a road integrity condition, a terrain condition, road construction, and/or any other condition that may pose a risk to, or change the nature of the risk to, the operation of the vehicle 102 and/or the safety of a passenger riding in the vehicle 102. The driving condition detection module 210 may include a driving environment data storage 212, an external driving condition detection program memory 214, and an external driving condition detection criteria data storage 216. The driving environment data storage 212 is configured to store the driving environment data received, via the transceiver 204, from the external communication component 112. The driving condition detection program memory 214 stores program instructions for detecting one or more external driving conditions based on the driving environment data collected by the external communication component 112. The external driving condition detection program may comprise one or more algorithms, machine learning techniques, data comparison, and/or other techniques for detecting an external driving condition based on the driving environment data. In some embodiments, external driving conditions may be detected based on criteria data stored in the external driving condition detection criteria data storage 216, indicative of a threshold and/or other criteria defining when a particular external driving condition exists.

Examples of a weather condition which the processor 202 may be configured to detect include, but are not limited to, rain, snow, hail, sleet, ice, fog, clouds, wind, and/or excess sun. Examples of a traffic condition which the processor 202 may be configured to detect include heavy traffic, vehicle congestion levels, bumper-to-bumper traffic, an accident, a traffic sign (such as a stop sign), presence of pedestrians, pedestrian congestion levels, a traffic light and its current condition (e.g. green, yellow, or red), a closed street, a speed limit, an intersection, tight turn, and/or any other detectable driving related condition. Examples of a road integrity condition which the processor 202 may be configured to detect include, but are not limited to, a pothole, unpaved road, speed control device, road slipperiness, road firmness, and/or any other detectable condition related to the physical condition of a road. Examples of a terrain condition which the processor 202 may be configured to detect include, but are not limited to, road slope, rolling hills, mountains, desert terrain, beach terrain, city driving conditions, rural driving conditions, a winding road, lane width, and/or any other detectable conditions that may affect a road.

In analyzing the driving environment data to detect an external driving condition, the processor 202 may analyze historical accident information and/or test data involving vehicles having autonomous or semi-autonomous functionality. Factors that may be analyzed and/or accounted for by the processor 202 may include, but are not limited to, points of impact, vehicle type/style, vehicle behavior, vehicle speed, type of road, time of day, type/length of trip, level of pedestrian traffic, level of vehicle congestion, and/or other factors that could affect the likelihood of a crash. The processor 202 may weigh certain factors according to historical accident information, predicted accidents, vehicle trends, test data, and/or other considerations.

The vehicle action detection module 220 is configured to receive and analyze vehicle operation data (e.g., vehicle control data, or other data indicative of the vehicle control data) from the vehicle operation controller 150, and/or or another component of the vehicle 102 (e.g., one or more sensors of the vehicle 102), in order to determine whether the vehicle 102 has taken a specific action. Examples of a specific action which the processor 202 may be configured to detect include, but are not limited to, the vehicle 102 accelerating, decelerating, turning, braking, changing lanes, merging, moving in reverse, and/or any other physical movement by the vehicle 102, any of its systems, and/or any of its components. The vehicle action detection module 220 may include a vehicle operation data storage 222, a vehicle action detection program memory 224, and a vehicle action detection criteria memory 226. The vehicle operation data storage 222 may store vehicle operation data received from the vehicle operation controller 150 and/or one or more vehicle sensors. The vehicle detection program memory 224 may be configured to store program instructions for detecting the specific action based on the vehicle operation data.

In some embodiments, vehicle operation data may be gathered via devices employing wireless communication technology, such as Bluetooth or other IEEE communication standards and then transmitted to the vehicle operation data storage 222. The vehicle operation data associated with the vehicle action and/or performance that is gathered or collected at, or on, the vehicle may be wirelessly transmitted to vehicle operation data storage 222 and/or a remote server (such as a remote processor or server associated with an insurance provider, if a driver has expressly agreed to participate in a program involving data collection/sharing). In an example of this embodiment, a Bluetooth enabled smartphone or mobile device, carried by a passenger riding in the vehicle 102, may collect vehicle operation data indicative of the speed of the vehicle 102 and transmit the collected vehicle operation data in real-time to the vehicle computer 200 to be analyzed.

The actuator control module 230 is configured to determine a better/safer physical configuration for the interior vehicle component 140 and to cause the actuator component 130 to adjust the physical configuration of, and/or restrict movement of, the interior vehicle component 140 in response to the external driving condition being detected and/or the vehicle 102 taking a specific action. The actuator control module 230 may include an actuator program memory 232, an IVC configuration data storage 234, and/or passenger profile data storage 238. The actuator program memory 232 may include program instructions that are executed to cause the actuator component 130 to move/restrict movement of the interior vehicle component 140. It should be appreciated that the term IVC is an abbreviation for the term "Interior Vehicle Component."

Data corresponding to physical configurations of the interior vehicle component 140 may be stored in the IVC configuration data storage 234. For example, the IVC configuration data storage 234 may contain data indicative of a default physical configuration, a current/initial physical configuration, a physical configuration set by a passenger, and/or set of potential physical configurations to which the interior vehicle 140 may be adjusted in response to detecting a specific external driving condition and/or the vehicle 102 taking a specific action. In some embodiments, IVC configuration data may correspond to a range of physical configurations that the interior vehicle component 140 may be adjusted or limited/restricted to in response to the processor 202 detecting (and/or for as long as the processor 202 detects) the vehicle 102 taking a specific action. In some embodiments, the physical configuration of the interior vehicle component 140 may be predetermined, determined in real-time, determined in response to passenger data stored in the passenger profile data storage 238, and/or determined in response to the processor 202 detecting an external driving condition and/or detecting the vehicle 102 has taken a specific action.

In determining a physical configuration of the interior vehicle component 140, the processor 202 may take into account a passenger's preferences and/or characteristics/traits. The passenger profile data storage 238 may contain data indicative of one or more passenger's physical characteristics, biometric traits, pre-existing health conditions, mental health status, and/or any other physiological conditions. Examples of a passenger's preferences may include a passenger selected and/or preferred orientation, position, and/or configuration of the interior vehicle component 140. Examples of passenger profile data include, but are not limited to, a passenger's height, weight, gender, age, education level, profession, disabilities/impairments/limitations, and/or pregnancy status. In some embodiments, passenger profile data is collected using the interior data collection component 120 and/or transmitted to the vehicle computer 200 from a third party device, server, network, or other remote database.

Referring now back to FIG. 1A, the interior data collection component 120 is configured to collect data indicative of an interior configuration of the vehicle 102 and/or data corresponding to one or more passengers inside the vehicle 102, and transmit the collected data to the vehicle computer 200, or a component of the vehicle computer 200. For example, the interior data collection component 120 may be configured to collect data representing the physical configuration of the interior vehicle component 140, the presence of one or more passengers in the vehicle 102, and/or the position of the one or more passengers (e.g., relative to the interior vehicle component 140).

The interior data collection component 120 may also be configured to collect data indicative of the one or more passengers' physical characteristics, biometric traits, preexisting health conditions, and/or any other physiological conditions. The interior data collection component 120 may include one or more sensors, such as an occupancy sensor, a motion sensor, a thermometer, a weight sensor, a pressure sensor, a biometric sensor, a camera, a microphone, and/or any other device equipped to collect data relating to any other measurable event or physical phenomenon within the vehicle 102. The interior data collection component 120 may comprise multiple components. The interior data collection component 120 may include a clock configured to timestamp the date and time that data is collected by the interior data collection component 120. The interior data collection component 120 may be removably or fixedly installed within the vehicle 102 and may be disposed in various arrangements to collect passenger and/or interior vehicle component 140 physical configuration data. The interior data collection component 120 may be a mobile device, conducting electrode, and/or wearable device affixed to a passenger of the vehicle 102. The interior data collection component 120 may be housed within, under, above, and/or on the interior vehicle component 140, for example. The interior data collection component 120 may be in hardwired and/or wireless communication with the vehicle computer 200. The interior data collection component 120 may be designed to operate according to predetermined specifications, such as a dedicated short-range communication (DSRC) channel, wireless telephony, Wi-Fi, or other existing or later-developed communications protocols.

The actuator component 130 is configured to mechanically control and/or restrict movement of one or more mechanisms of the interior vehicle component 140 in order to reduce the risk of injury to one or more vehicle passengers. The actuator component 130 may use electronic, pneumatic, hydraulic, thermal, and/or magnetic means to mechanically operate the interior vehicle component 140. The actuator component 130 may adjust and/or restrict movement of the entire interior vehicle component 140 or a part, portion, or section of the interior vehicle component 140. The actuator component 130 may be configured to receive a command, or a message/signal indicative of a command, from the actuator control module 230, to adjust and/or restrict movement of the interior vehicle component 140 in response the vehicle computer 200 detecting an external driving condition and/or detecting the vehicle 102 taking a specific action. In some embodiments, the actuator control module 230 generates an analog or digital power signal to control the actuator 130. The actuator component 130 may be configured to mechanically adjust the physical configuration, orientation, and/or position of the interior vehicle component 140.

Examples of adjusting the physical configuration, orientation, or position of the interior vehicle component 140 include, but are not limited to, adjusting the yaw angle, pitch angle, and/or roll angle of the interior vehicle component 140. Other examples of adjusting the physical configuration, orientation, and/or position include, but are not limited to, moving the interior vehicle component 140 in at least one of a forward, backward, upward, downward, clockwise, counterclockwise, or lateral direction relative to the vehicle 102. For example, when the interior vehicle component 140 is a passenger seat, in response to a detecting the vehicle 102 is going to be in a head-on collision, the actuator component 130 may move the passenger seat backwards and rotate the passenger seat away from facing the windshield to prevent a passenger from being struck by shattered glass. In another example in which the interior vehicle component 140 is a passenger seat, the actuator component 130 may adjust the passenger seat to a physical configuration that will protect a passenger from experiencing harmful G-forces. For instance, after detecting an impending collision, the actuator component 130 may rotate the passenger seat away from the direction of the expected point of impact so that the passenger's head would be pushed backward into a headrest of the passenger seat, rather than the passenger's head being whipped forward and down into his/her chest, during the impact. Accordingly, adjusting the physical configuration of the passenger seat would reduce the risk of a passenger experiencing whiplash and/or broken bones, tissue damage, and/or another injury caused by the collision.

Examples of the actuator component 130 include, but are not limited to, a motor or other device configured to move a seat, engage/disengage a seatbelt, tighten/loosen a seatbelt, roll up/down a window, open/close a sunroof, lock/unlock a vehicle door, lock/unlock an interior compartment, deploy an airbag, and/or operate any other interior vehicle component 140 to improve the safety of a vehicle passenger. The actuator component 130 may be originally installed by a manufacturer of the vehicle 102, or installed as an aftermarket modification or addition to the vehicle 102.

In some embodiments, the actuator component 130 may include a Stewart strut system (i.e., a Stewart platform) disposed on a moveable platform with one or more legs of adjustable length. In such embodiments, when the processor 202 detects the vehicle 102 is taking a sharp turn, for example, the Stewart strut actuator component 130 may lengthen one or more of its legs and/or shorten some of its legs to adjust the physical configuration of the interior vehicle component 140 in order to prevent a passenger traveling in the vehicle 102 from sustaining an injury (such as hitting his/her head) caused by the vehicle 102 taking the sharp turn.

The actuator component 130 may be configured to receive a command, message, and/or signal from the actuator control module 230 to prevent the interior vehicle component 140 from being adjusted or moved beyond a predetermined range of physical configurations, conditions, or positions. For example, the actuator control module 230 may transmit a signal to the actuator component 130 corresponding to a range of permissible positions to which the actuator component 130 may move the interior vehicle component 140, thereby restricting the actuator component 130 from moving the interior vehicle component 140 to any position outside that range. In some embodiments, for example, the actuator control module 230 causes the actuator component 130 to prevent passengers from manually adjusting the interior vehicle component 140 (or a component thereof). For example, the actuator component may be a set of electronic latches configured to restrict a vehicle passenger from reclining the back rest of a seating apparatus beyond a certain angle. In some embodiments, restricting movement of the interior vehicle component 140 entails reinforcing and/or strengthening the physical support system of the interior vehicle component 140.

Whereas in other embodiments, the actuator component 130 may include a locking mechanism configured to restrict movement of the entire interior vehicle component 140. For example, when the actuator component 130 is a Stewart strut system, movement of one or more of the Stewart strut system's legs may be restricted using a locking mechanism, thereby keeping one or more legs confined to a specific length, to prevent the interior vehicle component 140 from moving in a certain manner.

The interior vehicle component 140 is a physical element, unit, device, and/or apparatus contained or accessible from within the vehicle 102. The interior vehicle component 140 is configured to have its physical configuration adjusted, or its movement restricted, by the actuator component 130 in response to the vehicle computer 200 detecting an external driving condition and/or detecting the vehicle 102 taking a specific action. The interior vehicle component 140 may have its physical configuration adjusted, or its movement restricted, to improve the safety of, prevent injury to, reduce the risk of injury to, minimize injury to, and/or to protect one or more passengers riding in/on the vehicle 102. For example, in an embodiment in which the interior vehicle component is a window, the window may be adjusted from open to close in response to the processor 202 detecting a harmful chemical or heavy smoke in the air outside the vehicle 102, and thus the window is closed to minimize/prevent exposure of a vehicle passenger to the harmful chemical or smoke. Conversely, in a similar example, an already closed window may be restricted from being adjusted open because the processor 202 has detected a harmful chemical or smoke in the air outside the vehicle 102, and opening the window (or allowing the window to be opened manually by a passenger) would expose a passenger to the harmful chemical or smoke. Whereas in another example in which the interior vehicle component 140 is a passenger seat, in response to detecting an impending collision, the actuator component 130 may restrict the passenger seat's physical configuration (i.e. lock the seat in place and reinforce its support system) so that the passenger seat is not displaced, and the passenger injured, as a result of the collision impact.

The interior vehicle component 140 may be originally installed by a manufacturer of the vehicle 102, installed as an aftermarket modification or addition to the vehicle 102, or may be an item that happens to be present in the vehicle at a particular time (e.g., because a passenger carried the item onto the vehicle 102). Examples of the interior vehicle component 140 include, but are not limited to, a seating apparatus, computer, mobile device, steering wheel, a mirror, window, a door, a hardtop convertible roof, a soft-top convertible roof, a floor panel, a visor, partition, sunroof, sky roof, user interface, control panel, head rest, arm rest, back rest, storage module, beverage holder, foot rest, bed, seatbelt, airbag, surface, desk, work surface, child seat, and/or other element. In some embodiments, the interior vehicle component 140 may be a component that is accessible from the interior and exterior of the vehicle 102, such as a vehicle door or window.

The interior vehicle component 140 may be in a first physical configuration, orientation, or position prior to the vehicle computer 200 detecting an external driving condition. The interior data collection component 120 may collect data corresponding to the first physical configuration of the interior vehicle component 140, before and/or during operation of the vehicle 102, so that the processor 202 has reference data from which to evaluate whether a passenger is at risk of sustaining an injury if an external condition is detected and/or the vehicle 102 takes a specific action. The first physical configuration of the interior vehicle component 140 may be set by a manufacturer, the vehicle computer 200 (or a component of the vehicle computer 200), or manually by an end user or passenger. In response to the vehicle computer 200 detecting an external driving condition and/or detecting the vehicle 102 has taken a specific action, the actuator component 130 may adjust/move the interior vehicle component 140 to a second physical configuration in order to reduce the risk of injury to a passenger riding in the vehicle 102. In some embodiments, the interior vehicle component 140 may be configured to restrict the movement of one or more passengers while inside the vehicle 102.

In some embodiments, the physical configuration of the interior vehicle component 140 may not be adjusted or restricted, in response to the processor 202 detecting an external driving condition and/or detecting the vehicle 102 has taken a specific action, because the processor 202 determines that a passenger is not at risk of sustaining an injury, and/or that the current first physical configuration of the interior vehicle component 140 is already in a physical configuration that sufficiently reduces the risk of injury to a passenger riding in the vehicle 102. For example, in embodiments in which the interior vehicle component is a passenger seat, the processor 202 may determine that the vehicle 102 is going to collide with an external object. However, the current physical configuration of the passenger seat may nonetheless be maintained because the processor 202 has determined that the passenger seat is already in the best physical configuration to protect the seated passenger, and/or adjusting the physical configuration of the passenger seat would increase the risk of injury to the passenger. In another example in which the interior vehicle component 140 is a passenger seat, the processor 202 may detect that the vehicle is braking. However, the current physical configuration of the passenger seat may be maintained because the processor 202 has determined that a passenger seated in the passenger seat will not feel any detrimental effects from the braking (e.g., because the vehicle 102 was traveling at a low speed).

In one embodiment of the system 100, as depicted in FIG. 1A, prior to and/or during operation of the vehicle 102, the interior data collection component 120 collects data indicative of a current/first physical configuration of the interior vehicle component 140, and/or passenger data corresponding to a passenger riding in the vehicle 102. The processor 202 stores the first configuration data in the IVC configuration data storage 234 and stores the passenger data in the passenger profile data storage 238. This data is collected so that the processor 202 has a reference point of pertinent information for assessing whether a passenger riding in the vehicle 102 is at risk of sustaining an injury while in the vehicle 102. Thereafter, the external communication component 112 collects driving environment data and transmits the driving environment data to the vehicle computer 200. The vehicle computer 200 receives the driving environment data via the transceiver 204, and the processor 202 stores the driving environment data in the driving environment data storage 212. After the driving environment data is collected, received, and stored in the driving environment data storage 212, the processor 202 executes an external driving condition detection program, stored in the external driving condition detection program memory 214, which is configured to analyze the driving environment data to determine whether a hazardous external driving condition exists.

When the processor 202 detects the external driving condition, the processor 202 executes an actuator program stored in the actuator program memory 232 to cause the actuator component 130 to adjust the physical configuration of the interior vehicle component 140 from the first physical configuration to a second physical configuration, stored as IVC physical configuration data in the IVC configuration data storage 234. The actuator component 130 then adjusts the interior vehicle component 140, in response to detecting the external driving condition, to the second physical configuration to prevent injury to, reduce the risk of injury to, minimize injury to, and/or protect one or more passengers of the vehicle 102.

By way of a non-limiting example to demonstrate this embodiment of the system 100, a sensor (e.g., the external communication component 112) coupled to the vehicle 102 collects data (driving environment data) representing the position and speed of an adjacent vehicle (e.g., object 199) driving in close proximity to the vehicle 102. The sensor transmits this data to a processor 202 (within the vehicle computer 200), and the processor 202 detects, based on this data, whether the vehicle 102 and the adjacent vehicle may collide by comparing, for example, the two vehicle's positions, speeds, and/or trajectories. When the processor 202 determines that the vehicle 102 and the adjacent vehicle may collide, the processor 202 causes the actuator component 130 to adjust the physical configuration of a passenger's seat (e.g., the interior vehicle component 140) from its current configuration (the "first" physical configuration) to a second physical configuration in order to prepare the passenger for impact and reduce the risk of the passenger sustaining an injury resulting from the collision between the vehicle 102 and the adjacent vehicle.

In an alternative embodiment of the system 100, in response to the processor detecting the external driving condition, the processor 202 executes an actuator program stored in the actuator program memory 232 to cause the actuator component 130 to restrict movement of the interior vehicle component 140 from the first physical configuration to a range of physical configurations, stored as IVC configuration range limit data in the IVC configuration data storage 234. The actuator component 130 then restricts movement of the interior vehicle component 140 to a range of physical configurations in order to reduce the risk of/minimize injury to one or more passengers of the vehicle 102.

By way of a non-limiting example to demonstrate this embodiment of the system 100, a sensor (e.g., the external communication component 112) affixed to the vehicle 102 collects data (driving environment data) representing traffic conditions, weather conditions, road conditions, and speed of adjacent vehicles (e.g., external object 199) traveling on the same road as vehicle 102. The sensor transmits this data to a processor 202 (within the vehicle computer 200), and the processor 202 may detect based on this data, for example, that there is heavy traffic, it is snowing, the roads are icy, and adjacent vehicles are traveling at an excessive speed, and thus there is a high likelihood that the vehicle 102 will be involved in an crash. In response to this determination, the processor 202 causes the actuator component 130 to restrict the physical configuration of a passenger's seat (the interior vehicle component 140), or a portion of a passenger's seat such as a backrest, from exceeding a specific range of configurations in order to prepare the passenger for impact and reduce the risk of the passenger sustaining an injury as a result of the collision. Therefore, a passenger may be restricted to reclining his/her seat, for example, to a set range of positions, but may be unable to recline his/her seat beyond a specific position in order to ensure that the passenger has adequate back support in the event the vehicle 102 is in a crash.

In an alternative embodiment of the system 100, in response to the processor detecting the external driving condition, the processor 202 executes an actuator program stored in the actuator program memory 232 to cause the actuator component 130 to restrict movement of the interior vehicle component 140 to its current/first physical configuration. The actuator component 130 then restricts movement of the interior vehicle component 140 in order to reduce the risk of/minimize injury to one or more passengers of the vehicle 102.

By way of a non-limiting example to demonstrate this embodiment of the system 100, a sensor (e.g., the external communication component 112) affixed to the vehicle 102 collects data (driving environment data) representing traffic conditions, weather conditions, road conditions, and speed of adjacent vehicles (e.g., external object 199) traveling on the same road as vehicle 102. The sensor transmits this data to a processor 202 (within the vehicle computer 200), and the processor 202 may detect based on this data, for example, that there is heavy traffic, it is snowing, the roads are icy, and adjacent vehicles are traveling at an excessive speed, and thus there is a high likelihood that the vehicle 102 will be involved in an crash. In response to this determination, the processor 202 causes the actuator component 130 to restrict the physical configuration of a passenger's seatbelt (the interior vehicle component 140), or other passenger restraint safety device, from being adjusted/moved in order to prepare the passenger for impact and reduce the risk of the passenger sustaining an injury as a result of the collision. Therefore, a passenger may be secured into his/her seat, and unable to move, in order to ensure that the passenger is not ejected from the seat in the event the vehicle 102 is in a crash.

In another embodiment of the system 100, as depicted in FIG. 1A, the interior data collection component 120 collects data indicative of the current/first physical configuration of the interior vehicle component 140 and/or passenger data corresponding to a passenger riding in the vehicle 102. The processor 202 stores the first configuration data in an IVC configuration data storage 234 and stores the passenger data in the passenger profile data storage 238. While the vehicle is operating, a vehicle operation controller 150 generates vehicle operation data, corresponding to a vehicle's operational characteristics (such as speed, braking, tire angle, etc.) and stores the vehicle operation data in the vehicle operation data storage 222.

After the vehicle operation data is stored, the processor 202 executes a vehicle action detection program stored in the vehicle action detection program memory 224. The vehicle action detection program is configured to analyze the vehicle operation data to determine whether the vehicle 102 has taken a specific action. Specific actions which the processor 202 may be configured to detect include, but are not limited to, the vehicle 102 accelerating, decelerating, turning, braking, changing lanes, merging, moving in reverse, and/or any other physical movement by the vehicle 102, any of its systems, and/or any of its components. In some embodiments, the processor 202 will only detect any of the aforementioned specific actions when the vehicle 102 taking such action would injure or cause harm, or increase the risk of injuring or causing harm, to a passenger riding in the vehicle 102. The vehicle action detection program may comprise using one or more algorithms, machine learning techniques, data comparison, and/or any other methods for detecting whether the vehicle 102 has taken the specific action. In some embodiments, the processor 202 will use criteria data stored in the vehicle action detection criteria data storage 226, indicative of a threshold and/or other criteria defining when the vehicle 102 takes a specific action, to determine whether the vehicle 102 has taken the specific action.

When the processor 202 determines that the vehicle 102 has taken the specific action, the processor 202 executes an actuator program stored in the actuator program memory 232 to cause the actuator component 130 to adjust the physical configuration of the interior vehicle component 140 from the first physical configuration to a second physical configuration, stored as IVC physical configuration data in the IVC configuration data storage 234. The actuator component 130 then adjusts the interior vehicle component 140 to the second physical configuration to prevent injury to, reduce the risk of injury to, minimize injury to, and/or protect one or more passengers of the vehicle 102 in response to the vehicle 102 taking the specific action.

By way of a non-limiting example to demonstrate this embodiment of the system 100, to increase the speed of the vehicle 102, the vehicle operation controller 150 transmits a signal, indicative of a command to accelerate the vehicle 102, to a speed subsystem. Vehicle operation data, corresponding to a command to accelerate the vehicle, is transmitted to the vehicle computer 200 and stored in the vehicle operation data storage 222. The processor 202 then analyzes the vehicle operation data and detects whether the vehicle 102 is accelerating, for example by determining whether there has been a large increase in the speed of the vehicle 102 over a short time span and/or determining the speed of the vehicle 102 has exceeded a threshold.

When the processor 202 determines that the vehicle 102 is accelerating, the processor 202 executes the actuator control program to determine a second physical configuration to move the passenger's seat to that will improve the safety of a passenger riding in the vehicle 102. The second physical configuration may counteract and/or prevent a strain/effect, such as whiplash, imposed on a vehicle passenger as a result of the vehicle 102 accelerating. The processor 202, via the actuator control program, then causes the actuator component 130 to adjust the physical configuration of a passenger's seat 140 (the interior vehicle component 140) to the second physical configuration.

Conversely, in other embodiments, in response to the processor 202 determining that the vehicle 102 has taken the specific action, the processor 202 executes the actuator program stored in the actuator program memory 232 to cause the actuator component 130 to restrict movement of the interior vehicle component 140 to a range of physical configurations, stored in the IVC configuration data storage 234. The actuator component 130 then restricts the interior vehicle component 140 to its current physical configuration or to a range of physical configurations to reduce the risk of/minimize injury to, and/or protect one or more passengers of the vehicle 102 in response to the vehicle 102 taking the specific action.

By way of a non-limiting example to demonstrate this embodiment of the system 100, to increase the speed of the vehicle 102, the vehicle operation controller 150 transmits a signal, indicative of a command to accelerate the vehicle 102, to a speed subsystem. Vehicle operation data, corresponding to a command to accelerate the vehicle, is transmitted to the vehicle computer 200 and stored in the vehicle operation data storage 222. The processor 202 then analyzes the vehicle operation data and detects whether the vehicle 102 is accelerating, for example by determining whether there has been a large increase in the speed of the vehicle 102 over a short time span and/or determining the speed of the vehicle 102 has exceeded a threshold. When the processor 202 determines that the vehicle 102 is accelerating, the processor 202 executes the actuator control program to determine a range of physical configurations to restrict movement of the passenger's seat to that will improve the safety of a passenger riding in the vehicle 102. Restricting the physical configuration of the passenger seat to this range may prevent a strain/effect, such as whiplash, imposed on a vehicle passenger as a result of the vehicle 102 accelerating. The processor 202, via the actuator control program, then causes the actuator component 130 to restrict the physical configuration of a passenger's seat (the interior vehicle component 140) to the range of physical configurations.

FIG. 2A illustrates a first embodiment in which an interior vehicle component may be adjusted from a first physical configuration to a second physical configuration. As FIG. 2A illustrates, interior vehicle component 140A is disposed within a vehicle 102A in a first physical configuration 142A. In this embodiment, the interior vehicle component 140A is adjusted backwards to a second physical configuration 144A in response to the vehicle computer determining that an external driving condition has been detected or the vehicle 102A has taken a specific action. For example, in an embodiment in which the interior vehicle component 140A is a passenger seat in the vehicle 102A, when the processor detects that the vehicle 102A is going to collide head-on with another vehicle (or is going to collide with the front left door of the vehicle 102A, etc.), the processor may cause the actuator component to move the passenger seat from a current/initial physical configuration in the front end of the vehicle (the first physical configuration 142A) backwards to a new physical configuration towards the rear portion of the vehicle (the second physical configuration 144A) to reduce the risk of injury to a passenger created by the impending head-on collision.

In some embodiments, the interior vehicle component 140A may be restricted to a range of physical configurations 148A, wherein the interior vehicle component 140A is restricted to a physical configuration/position between the first physical configuration 142A and the second physical configuration 144A. In an example in which the interior vehicle component 140A is a passenger seat and the vehicle 102A is a small aircraft, the processor may determine the passenger must remain on the left side of the aircraft (to balance the weight of the aircraft) to enable the aircraft to safely take off and fly. Consequently, the configuration and/or movement of the passenger seat may be constricted to a physical configuration between a front configuration (142A) and a back configuration (144A), and the passenger seat may be restricted to only moving along the same line or plane.

FIG. 2B illustrates a second embodiment in which an interior vehicle component may be adjusted from a first physical configuration to a second physical configuration. As FIG. 2B illustrates, interior vehicle component 140B is disposed within a vehicle 102B in a first physical configuration 142B. In this embodiment, the interior vehicle component 140B is adjusted laterally to the right to a second physical configuration 144B in response to the vehicle computer determining that an external driving condition has been detected or the vehicle 102B has taken a specific action. For example, in an embodiment in which the interior vehicle component 140B is a passenger seat in the vehicle 102B, when the processor detects that the vehicle 102B is going to be hit by another vehicle on the left side of the vehicle, the processor may cause the actuator component to move the passenger seat from a current/initial physical configuration on the left side of the vehicle (the first physical configuration 142B) laterally to a new physical configuration towards the right side of the vehicle (the second physical configuration 144B) to reduce the risk of injury to a passenger created by the impending collision.

In some embodiments, the interior vehicle component 140B may be restricted to a range of physical configurations 148B, wherein the interior vehicle component 140B is restricted to a physical configuration/position between the first physical configuration 142B and the second physical configuration 144B. In another example in which the interior vehicle component 140B is a passenger seat, the vehicle 102B may be traveling or parked on a steep road, and the processor may determine that any frontwards/backwards motion from within the vehicle 102B could throw off the balance of the vehicle 102B and jolt the vehicle into a free-fall down the slope of the road. Consequently, the configuration or movement of the passenger seat may be constricted to a physical configuration between a left-side configuration (142B) and a right-side configuration (144B) and the passenger seat may be restricted to only moving laterally along the same line or plane.

FIG. 2C illustrates a third embodiment in which an interior vehicle component may be adjusted from a first physical configuration to a second physical configuration. As FIG. 2C illustrates, interior vehicle component 140C is disposed within a vehicle 102C in a first physical configuration 142C. In this embodiment, the interior vehicle component 140C is rotated about a yaw angle 146C in a clockwise direction to a second physical configuration 144C in response to the vehicle computer determining that an external driving condition has been detected or the vehicle 102C has taken a specific action. For example, in an embodiment in which the interior vehicle component 140C is a passenger seat in the vehicle 102C, when the processor detects that an object is going to hit the left side of the vehicle 102C, the processor may cause the actuator component to rotate the passenger seat from a current/initial physical configuration facing forward (the first physical configuration 142C) to a new physical configuration facing the right side of the vehicle (the second physical configuration 144C) to prevent the occurrence of whiplash for a seated passenger, and/or to prevent shattered glass from hitting the passenger.

In some embodiments, the interior vehicle component 140C may be restricted to a range of physical configurations 148C, wherein the interior vehicle component 140C is restricted to a physical configuration between the first physical configuration 142C and the second physical configuration 144C.

FIG. 2D illustrates a fourth embodiment in which an interior vehicle component may be adjusted from a first physical configuration to a second physical configuration. As FIG. 2D illustrates, interior vehicle component 140D is disposed within a vehicle 102D in a first physical configuration 142D. In this embodiment, the interior vehicle component 140C is rotated about a roll angle 146D to a second physical configuration 144D in response to the vehicle computer determining that an external driving condition has been detected or the vehicle 102D has taken a specific action. For example, in an embodiment in which the interior vehicle component 140D is a passenger seat in the vehicle 102D, when the processor detects the vehicle 102D is taking a sharp turn, the processor may cause the actuator component to tilt the passenger seat from a flat physical configuration (142D) to a tilted/angled physical configuration (144D) to prevent a passenger from suffering whiplash or other discomfort caused by the sharp turn.

In some embodiments, the interior vehicle component 140D may be restricted to a range of physical configurations 148D, wherein the interior vehicle component 140D is restricted to a physical configuration/position between the first physical configuration 142D and the second physical configuration 144D. For example, in the embodiment illustrated in FIG. 2D, the interior vehicle component 140D may be restricted to only rotating about the same plane. In an example in which the interior vehicle component 140D is a passenger seat and the vehicle 102D is a small aircraft, the processor may determine the passenger must remain positioned within a range of roll angles (to balance the weight of the aircraft) to enable safe operation of the aircraft and prevent the aircraft from unintentionally spinning into a barrel roll. Consequently, the configuration and/or movement of the passenger seat may be constricted to a physical configuration between a first configuration (142D) and a back second (144D), and the passenger seat may be restricted to only moving along the same line or plane.

FIG. 2E illustrates a fifth embodiment in which an interior vehicle component may be adjusted from a first physical configuration to a second physical configuration. As FIG. 2E illustrates, interior vehicle component 140E is disposed within a vehicle 102E in a first physical configuration 142E. In this embodiment, the interior vehicle component 140E is rotated about a pitch angle 146E to a second physical configuration 144E in response to the vehicle computer determining that an external driving condition has been detected or the vehicle 102E has taken a specific action. For example, in an embodiment in which the interior vehicle component 140E is a passenger seat in the vehicle 102E, when the processor detects that the vehicle 102E is going to collide head-on with another vehicle, the processor may cause the actuator component to adjust the passenger seat from an upright configuration (142E) backwards to a tilted/ angled physical configuration (144E) to reduce the impact felt by a passenger from the impending collision.

In some embodiments, the interior vehicle component 140E may be restricted to a range of physical configurations 148E, wherein the interior vehicle component 140E is restricted to a physical configuration/position between the first physical configuration 142E and the second physical configuration 144E. In another example in which the interior vehicle component 140E is a passenger seat in the vehicle 102, when the vehicle 102 is entering a steep downward slope of road, the processor may cause the actuator component to restrict the configuration and/or movement of the passenger seat to a range between the first physical configuration 142E and the second physical configuration 144E to balance out the weight of the vehicle 102 in order to regulate the speed and acceleration at which the vehicle travels down the road.

FIG. 2F illustrates a sixth embodiment in which an interior vehicle component may be adjusted from a first physical configuration to a second physical configuration. As FIG. 2F illustrates, interior vehicle component 140F is disposed within a vehicle 102F in a first physical configuration 142F. In this embodiment, the interior vehicle component 140F is adjusted upwards to a second physical configuration 144F in response to the vehicle computer determining that an external driving condition has been detected or the vehicle 102F has taken a specific action. For example, in an embodiment in which the interior vehicle component 140F is a passenger seat, when the processor detects that a driver cannot adequately see the road from its current physical configuration (142F), the processor may cause the actuator component to adjust the passenger seat upwards to a higher physical configuration (144F). Whereas in another example in which the interior vehicle component 140F is a passenger seat, when the processor determines that the vehicle 102F is entering a heavily flood area and/or is at risk of becoming submerged within a body of water, the processor may cause the actuator component to move the passenger seat upwards to prevent the passenger from getting wet, trapped underwater, and/or potentially drowning.

In some embodiments, the interior vehicle component 140F may be restricted to a range of physical configurations 148F, wherein the interior vehicle component 140F is restricted to a physical configuration/position between the first physical configuration 142F and the second physical configuration 144F. In an example in which the interior vehicle component 140F is a passenger seat and the vehicle 102F is a convertible automobile being operated with the top down, the processor may detect low hanging trees, low clearance viaducts, or other vertical obstructions overhanging a road on which the vehicle 102F is traveling. Accordingly, the processor may cause an actuator component to restrict the configuration and/or movement of the passenger seat to a range between the first physical configuration 142F and the second physical configuration 144F to protect the passenger from hitting his/her head on an overhanging obstruction.

FIG. 2G illustrates an embodiment in which movement of an interior vehicle component may be restricted. As FIG. 2G illustrates, interior vehicle component 140G has a full range of physical configurations 147G. In some embodiments, when the vehicle computer determines that an external driving condition has been detected or the vehicle 102G has taken a specific action, movement of the interior vehicle component 140G may be restricted to a range of physical configurations 148G, wherein the interior vehicle component 140G is restricted to a physical configuration/position between a first physical configuration 142G and the second physical configuration 144G.

Figure 2H:
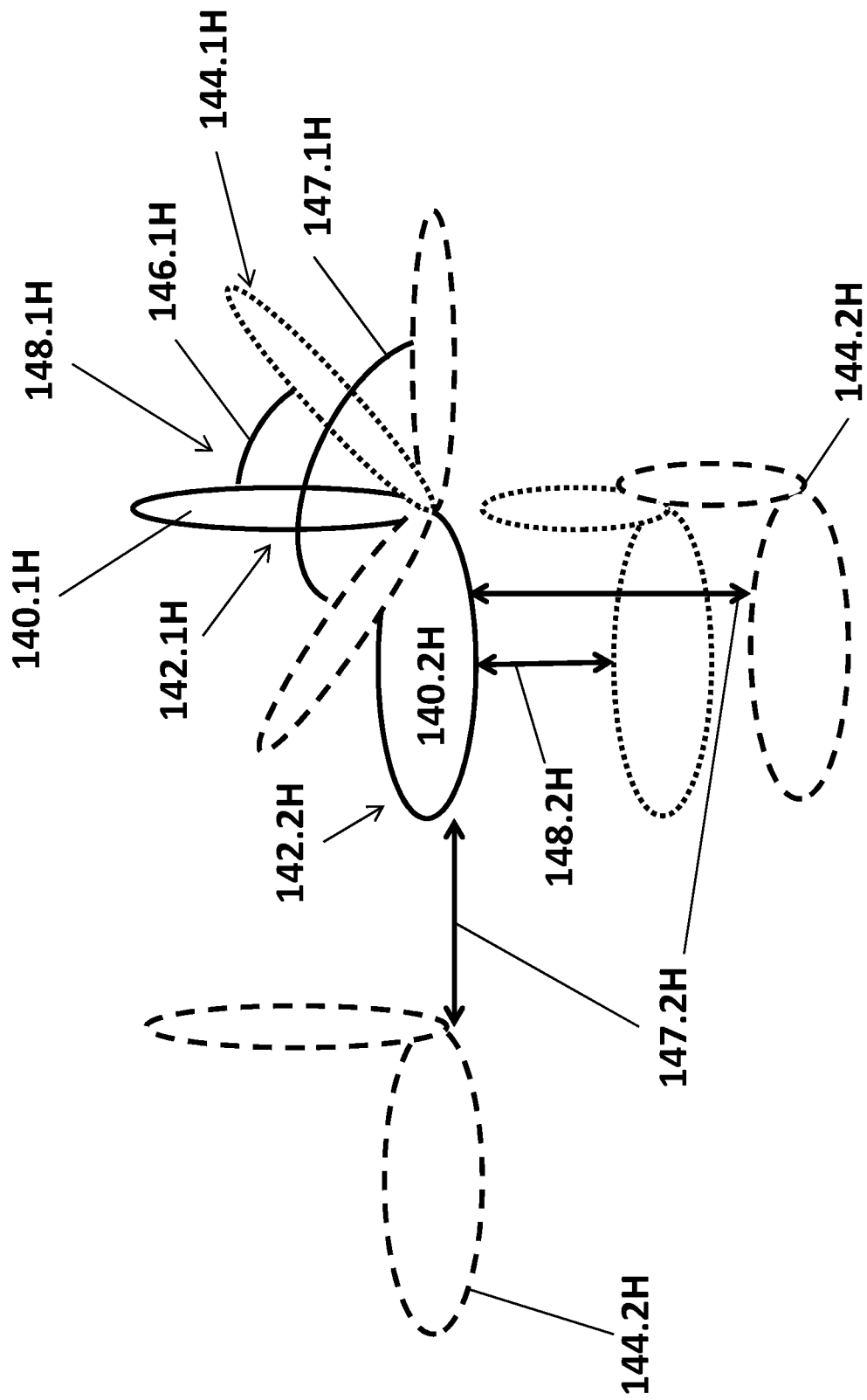
FIG. 2H illustrates an embodiment in which one or more components of an interior vehicle component may be adjusted from a first physical configuration to a second physical configuration.

FIG. 2H illustrates an embodiment in which one or more components of an interior vehicle component may be adjusted from a first physical configuration to a second physical configuration. As FIG. 2H illustrates, interior vehicle component 140H includes a first component 140.1H and a second component 140.2H. The first component 140.1H is in a first configuration 142.1H and the second component 140.2H is in a first configuration 142.1H. In this embodiment, the first component 140.1H is configured to be adjusted about a pitch angle 146.1H to a second physical configuration 144.1H, and the second component 140.2H is configured to be adjusted laterally and/or forwards/backwards to a second physical configuration 144.2H, in response to the vehicle computer determining that an external driving condition has been detected or the vehicle has taken a specific action. The first component 140.1H is configured to be adjusted to a full range of physical configurations 147.1H. The second component 140.2H is configured to be adjusted to a full range of physical configurations 147.2H. For example, the interior vehicle component 140H may be a passenger seat with a top component (140.1H) configured to support the upper body of a passenger (e.g. a back support), and a bottom component (140.2H) configured to support the lower body of a passenger (e.g. a chair, stool, seat, etc.). The passenger seat may be configured to recline up/down by adjusting the physical configuration of the top component 140.1H, thereby creating a full range of potential positions (147.1H) from seated upright to laying down. The passenger seat may be configured to move forwards, backwards, and laterally within an two-dimensional plane by adjusting the physical configuration of the bottom component 140.2H, thereby enabling a passenger to be seated in a variety of positions throughout the vehicle (147.2H) (e.g. front, back, left, middle, etc.).

In such an embodiment in which the interior vehicle component 140H is a passenger seat, when the processor detects that an approaching vehicle is going to rear-end collide with the vehicle in which the passenger seat 140H is contained, the processor may cause the actuator component to move the bottom component (140.2H) of the passenger seat from a current/initial physical configuration (142.2H), in the back end of the vehicle, forwards to a new physical configuration (144.2H), towards the front portion of the vehicle, to reduce the risk of injury to a passenger created by the impending collision. Additionally, the processor may simultaneously cause the actuator component to adjust the top component (140.1H) from an upright configuration (142.1H) to a second tilted/angled physical configuration (144.1H) to reduce the impact felt by a passenger from the impending collision.

However, in some embodiments, the first component 140.1H may be restricted to a range of physical configurations 148.1H, wherein the first component 140.1H is restricted to a physical configuration/position between the first physical configuration 142.1H and the second physical configuration 144.1H. Similarly, in some embodiments, the second component 140.2H may be restricted to a range of physical configurations 148.2H, wherein the second component 140.2H is restricted to a physical configuration/position between the first physical configuration 142.2H and the second physical configuration 144.2H. In another example in which the interior vehicle component 140H is a passenger seat, the top component 140.1H may be confined to allowing a passenger to recline the passenger seat to a range of physical configurations 148.1H that are between physical configuration 142.1H and physical configuration 144.1H. Further the passenger seat may be confined to moving laterally, via the bottom component, within a range of physical configurations 148.2H that are between physical configuration 142.2H and physical configuration 144.2H.

FIG. 2I illustrates an embodiment in which the configuration of an interior vehicle component may be adjusted using a Stewart strut system. In FIG. 2I, actuator component 1301 is a Stewart strut system that controls movement of interior vehicle component 140I using one or more struts 132. The physical configuration of the interior vehicle component 140 is adjusted by extending and/or shortening the length of the struts 132 in response to a vehicle computer (e.g., vehicle computer 200) determining that an external driving condition has been detected or the vehicle 102 has taken a specific action. For example, in an embodiment in which the interior vehicle component 140I is a passenger seat, the Stewart strut system may adjust the lengths of one or more of its legs (e.g. 132A, 132B, 132C, etc.) to adjust the physical configuration of the passenger seat. Thus, to tilt the passenger seat to the left (i.e., adjusting the roll angle of the passenger seat), strut 132A may be shortened, while strut 132C is lengthened and strut 132B remains the same length.

In some embodiments, one or more of the struts 132 of the Stewart strut system may be restricted to a static length (e.g., by the actuator control module 230) to prevent manual adjustment of the physical configuration of the interior vehicle component 140. In another example in which the interior vehicle component 140I is a passenger seat, to restrict movement of the passenger seat and keep it in a specific physical configuration, struts 132A, 132B, 132C, etc. may be locked in place by a locking mechanism to prevent adjusting the length of struts 132.

Figure 3:
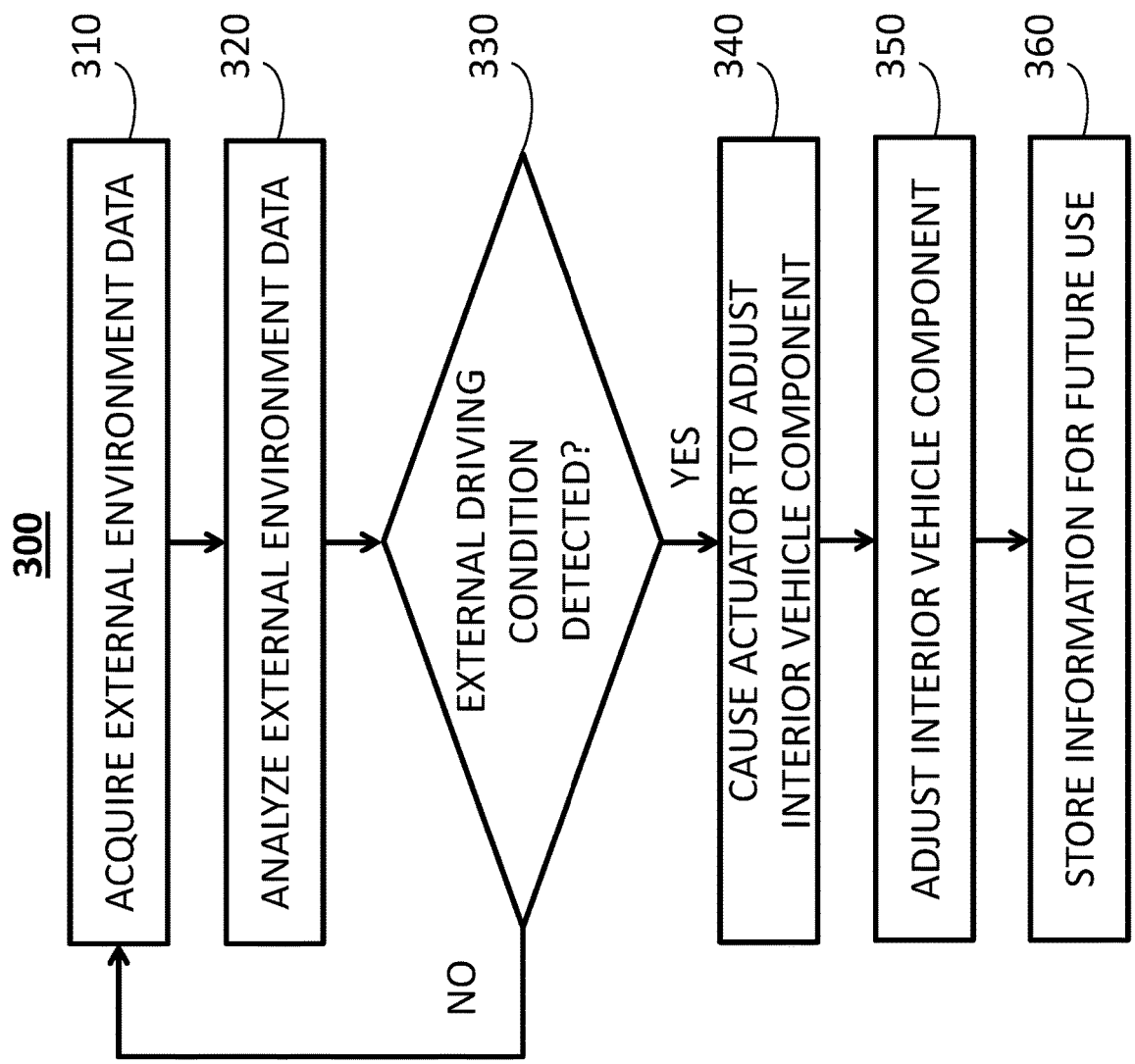
FIG. 3 illustrates a method for adjusting the physical configuration of an interior vehicle component of a vehicle in response to a processor detecting an external driving condition.

FIG. 3 illustrates a method 300 in which the physical configuration of an interior vehicle component of a vehicle (e.g., the interior vehicle component 140 of the vehicle 102 in FIG. 1A) is adjusted in response to a processor (e.g., processor 202 of FIG. 1B) detecting an external driving condition. In some embodiments, the method 300 is a method for implementing an embodiment of the system 100 for controlling an interior vehicle component's functionality. For example, the method 300 may be implemented as described above in connection with FIGS. 1A and 1B. Accordingly, the method 300 may be partially or completely implemented on the vehicle computer 200.

At step 310, driving environment data indicative of a physical environment external to the vehicle is acquired. Driving environment data may be collected, generated, and/or received using an external environment component (e.g., the external environment component 112 of FIG. 1A). In some embodiments, some or all of the driving environment data may be received from a third party device, machine, server, network, and/or database. Once collected, the driving environment data may be stored locally within the vehicle, for example in the driving environment data storage 212 of the vehicle computer 200, and/or transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein. For example, driving environment data may be received, either directly or through an intermediate network, from other vehicles traveling on the same road as the vehicle and/or an infrastructure component along the road, either directly or through an intermediate network. Step 310 enables the vehicle to receive driving environment data so that the vehicle may respond/react to conditions within a driving environment.

Next, at step 320, the driving environment data is analyzed (e.g., by the processor 202 of the vehicle computer 200 of FIG. 1A). In some embodiments, the driving environment data is analyzed in real-time to determine whether an external driving condition exists that may be hazardous to the operation of the vehicle and/or a passenger's safety. In one embodiment, the driving environment data may be analyzed by comparing acquired driving environment data corresponding to current driving environment conditions, previously collected driving environment data corresponding to past driving environment conditions, current vehicle operation data, and/or past vehicle operation data. Examples of current driving environment conditions may include objects currently adjacent to the vehicle, objects within the current trajectory of the vehicle, current traffic conditions, current road conditions, current weather conditions, and/or any other data about the current state of the driving environment external to the vehicle. Past conditions may include past traffic conditions, past road conditions, past weather conditions, and/or any other data about the previous state of the driving environment external to the vehicle. Past conditions may also include data about conditions that are similar to the current conditions and may further include data about conditions in the same or similar locations, as well as past behavior/actions of the same or similar type of vehicle, driver, pedestrian, and/or animal adjacent to the vehicle.

The driving environment data may also be analyzed to predict the likelihood of future behavior, actions, and/or events. For example, the expected path of an adjacent vehicle may be predicted, in furtherance of determining whether an external driving condition exists, by analyzing data corresponding to where the adjacent vehicle has driven in the past (e.g., frequent destinations, popular destinations in the area, commonly-used routes, etc.), speeds the adjacent vehicle has traveled at on certain roads, and/or other driving habits/behavior (e.g., frequently makes sudden stops, changes lanes, grossly exceeds the speed limit, drives substantially lower than a speed limit, frequently proceeds through a yellow light, frequently stops at yellow lights, often is located at the scene of vehicle collision, and other measureable and recordable driving habits that could affect the likelihood of a future collision). Accordingly, analyzing this data may help the processor determine the likelihood of an external driving condition occurring and/or determine more readily when an external driving condition does exist.

Driving environment data may also be analyzed to determine when (e.g., a time of day, time of year, etc.) and/or under what conditions a vehicle is at an elevated risk of exposure to an external driving condition. For example, certain road areas may be more problematic during rush hour or at night, during winter months when roads freeze over, when under construction, or when it is raining. Whereas in another example, driving environment data may indicate that certain intersections or portions of roads may be associated with a higher-than-average number of vehicle, bicycle, and/or pedestrian collisions, a higher amount of traffic, a large amount of road construction, and/or abnormal traffic patterns.

For example, to determine whether a particular external driving condition exists, such as an impending collision, the method may compare the received driving environment data with data covering the same weather and road conditions for the same speed at which the vehicle is traveling. The driving environment data may be analyzed to determine whether certain roads and/or intersections are prone to certain types of collision-causing hazards (such as parked cars, wildlife running into the road, roads seldom sprinkled with salt to prevent icing over, potholes, sharp turns, narrow roads, etc.). The driving environment data may indicate that the vehicle is approaching a slowing or parked vehicle, and given the current speed of the vehicle and the distance between the vehicle and the slowing/parked vehicle, the vehicle is going to collide with the slowing or parked vehicle.

After analyzing the driving environment data, at step 330, an external driving condition detection program is executed to detect whether an external driving condition exists based on the driving environment data. The external driving detection program may be stored in a program memory (e.g. the external driving detection program memory 214). The existence of an external driving condition may be determined by comparing the driving environment data with a maximum or minimum criteria/threshold that is indicative of the point at which an external driving condition is detected. In some embodiments, the criteria/threshold indicative of the point at which an external driving condition is detected may be stored in a data storage unit (for example the external driving condition criteria data storage 216 of FIG. 1B). To detect the external driving condition, the driving environment data, or the value corresponding to the driving environment data, may need to be equal to/the same as, less than, or greater than the criteria/threshold, or a value corresponding to the criteria/threshold.

These thresholds may apply directly to the driving environment data or vehicle operation data, or may apply to a more advanced driving environment data analysis. For example, in one embodiment configured to detect whether an adjacent vehicle is going to collide with the vehicle (the external driving condition), data corresponding to the distance between the vehicle and the adjacent vehicle (the driving environment data) may be analyzed by a processor. In such an embodiment, the threshold for detecting an impending collision may be a distance between the two vehicles that is 2-feet or less. Consequently, when the analysis of the driving environment data reveals the distance between the vehicle and the adjacent vehicle is only 1.5-feet, the processor detects that there is a risk of an impending collision (thereby detecting the existence of the external driving condition). However, an impending collision may not be detected until the adjacent vehicle and the vehicle are within 2 feet or less of each other. In this way, until the external driving condition is detected, unnecessarily adjusting the physical configuration of the interior vehicle component may be avoided.

Further, depending on other relevant conditions, different threshold values (i.e. larger or smaller) may be used to detect an external driving condition. For example, in detecting the likelihood of an impending collision (the external driving condition) between a vehicle and an adjacent vehicle based on the distance between the two vehicles, weather conditions, traffic conditions, and/or road conditions may be taken into account in determining a threshold value. In such an embodiment, when it is snowing and the road is icy, the threshold indicative of an impending collision may increase from "2 feet or less" to "10 feet or less" between the two vehicles because of the increased risk of a vehicle skidding.

Alternatively, in an embodiment, the driving environment data may be used to calculate a different value associated with the likelihood of an external driving condition occurring. In such an embodiment, the external driving condition may be detected when the determined value exceeds a predetermined value, indicative of the likelihood of an external driving condition occurring. The calculated value may reflect, for example, a predicted probability of a collision between the vehicle and an external object, or predicted likelihood of an injury to a passenger traveling in the vehicle. For example, based on the analysis of the collected driving environment data, an impending collision may be detected when there is a 75% chance or higher likelihood that the vehicle and the external object will collide. In another example, based on the analysis of the collected driving environment data, an external driving condition may be detected because the external driving condition is indicative of an above 50% chance that a passenger of the vehicle may suffer an injury.

While some embodiments of the method 300 have been discussed using individual thresholds to detect an external driving condition, it should be appreciated that detection of an external driving condition may entail the use of multiple criteria and/or thresholds, and/or machine learning (as discussed further below). Further, an embodiment using more than one criteria/threshold may not require that every criterion/threshold be met/exceeded to determine a driving condition exists. For example, in one embodiment and scenario, driving environmental data may be analyzed to determine whether a moving vehicle (such as the adjacent object 199 of FIG. 1A) is going to collide with a stationary vehicle (such as the vehicle 102 of FIG. 1A). Data related to criteria such as the distance between the moving vehicle and the stationary vehicle, the speed of the moving vehicle, the trajectory of the moving vehicle, the slipperiness of the road on which the moving vehicle is driving on, whether the stationary vehicle is parked or just has the brakes temporarily applied, whether the stationary vehicle has sufficient space or time to move out of the trajectory of the vehicle, and/or any other relevant criteria, may be analyzed to detect whether a collision between the two vehicles may occur. While the speed of the vehicle may be determined to not exceed a threshold indicative of an impending collision with the stationary vehicle, the external driving condition of collision between the two vehicles may nonetheless still be detected because the slipperiness of the road exceeds a certain threshold value and the stationary vehicle is parked and does not have adequate space and/or time to move out of the trajectory of the moving vehicle.

In some embodiments, one or more real-time calculations may be performed, using the driving environment data, to determine whether an external driving condition exists. In an example in which the vehicle is stopped but another vehicle (the external object) is approaching the vehicle, driving environment data corresponding to the approaching vehicle's speed and the distance between the two vehicles may be analyzed to determine whether a collision will occur. The collecting driving environment data may be used to calculate whether the approaching vehicle is travelling at a speed for which it would be physically incapable of stopping, given the distance between the two vehicles, without colliding with the stopped vehicle. In another example, driving environment data corresponding to a speed limit in kilometers per hour may be collected and then converted into a speed limit in miles per hour in furtherance of detecting an external driving condition.

When the external driving condition is not detected, then the method returns to step 310 to collect more driving environment data and repeats the method 300 as described above (e.g., on a periodic basis). However, when the external driving condition is detected, then the method proceeds to step 340.

At step 340, in response to detecting the external driving condition, an actuator program, stored in an actuator program memory (for example the actuator program memory 232 of FIG. 1B), is executed to cause an actuator component (such as the actuator component 130 of FIG. 1A) to adjust the physical configuration of the interior vehicle component (such as the interior vehicle component 140 of FIG. 1A). The actuator program causes the interior vehicle component to be adjusted to a second physical configuration. The second physical configuration may correspond to data stored in a data storage unit (e.g. the IVC configuration data storage 234 of FIG. 1B).

In some embodiments, adjusting the physical configuration of the interior vehicle component from a first physical configuration to the second physical configuration is intended to reduce the risk of injury to a passenger riding in the vehicle. For example, when the external driving condition of an impending vehicle collision is detected, and the interior vehicle component is a passenger seat, a safer physical configuration of the passenger seat is determined based on the expected direction of force (and possibly also the magnitude/amount of force) from the collision impact. Accordingly, the physical configuration of the passenger seat may be adjusted to a position (e.g. backwards away from the impending crash) that reduces the effects of whiplash on a passenger. Similarly, for example, a second interior vehicle component, such as a seatbelt, may be engaged/repositioned to secure a passenger in anticipation of the impending collision and to prevent the passenger from being ejected from the passenger seat.

In some embodiments, passenger data, collected by an interior data collection component (such as the interior data collection component 120 of FIG. 1A) and stored in a data storage (such as the passenger profile data storage 238 of FIG. 1B), may also be used to determine and/or affect the second physical configuration of the interior vehicle component. For example, if a passenger is pregnant, this information may be factored into determining how/where to cause the actuator component to adjust the interior vehicle component because certain movements (e.g. rapid or sharp movements) and/or configurations (e.g. a configuration that puts pressure on the passenger's stomach) may be detrimental to the pregnant passenger and/or her child.

Similarly, for example, if a passenger has a back injury/condition, moving the interior vehicle component to a certain configuration may cause the passenger discomfort and/or may further aggravate the condition. Therefore, this passenger information may be considered in determining how to adjust the interior vehicle component.

After the actuator program has been executed to determine the second physical configuration of the interior vehicle component, then at step 350, the physical configuration of the interior vehicle component may be adjusted from the first physical configuration to the second physical configuration.

Some embodiments of the method 300 may include step 360, at which information received, generated, calculated, detected, and/or determined during the method 300 may be stored for future use. Stored information may include, but is not limited to, the driving environment data collected at step 310, the external driving condition detected at step 330, and/or the second physical configuration determined at step 340. Storing this information for future use may be used to improve the accuracy and speed of analyzing driving environment data, detecting an external driving condition, training machine learning models which may be used for detecting the external driving condition, determining an interior vehicle component physical configuration, and/or adjusting the interior vehicle component. The recorded information may be stored locally in the vehicle computer and/or may be transmitted to a third party machine (e.g., if a driver has expressly agreed to participate in a program involving data collection/sharing). In some embodiments, recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

Figure 4:
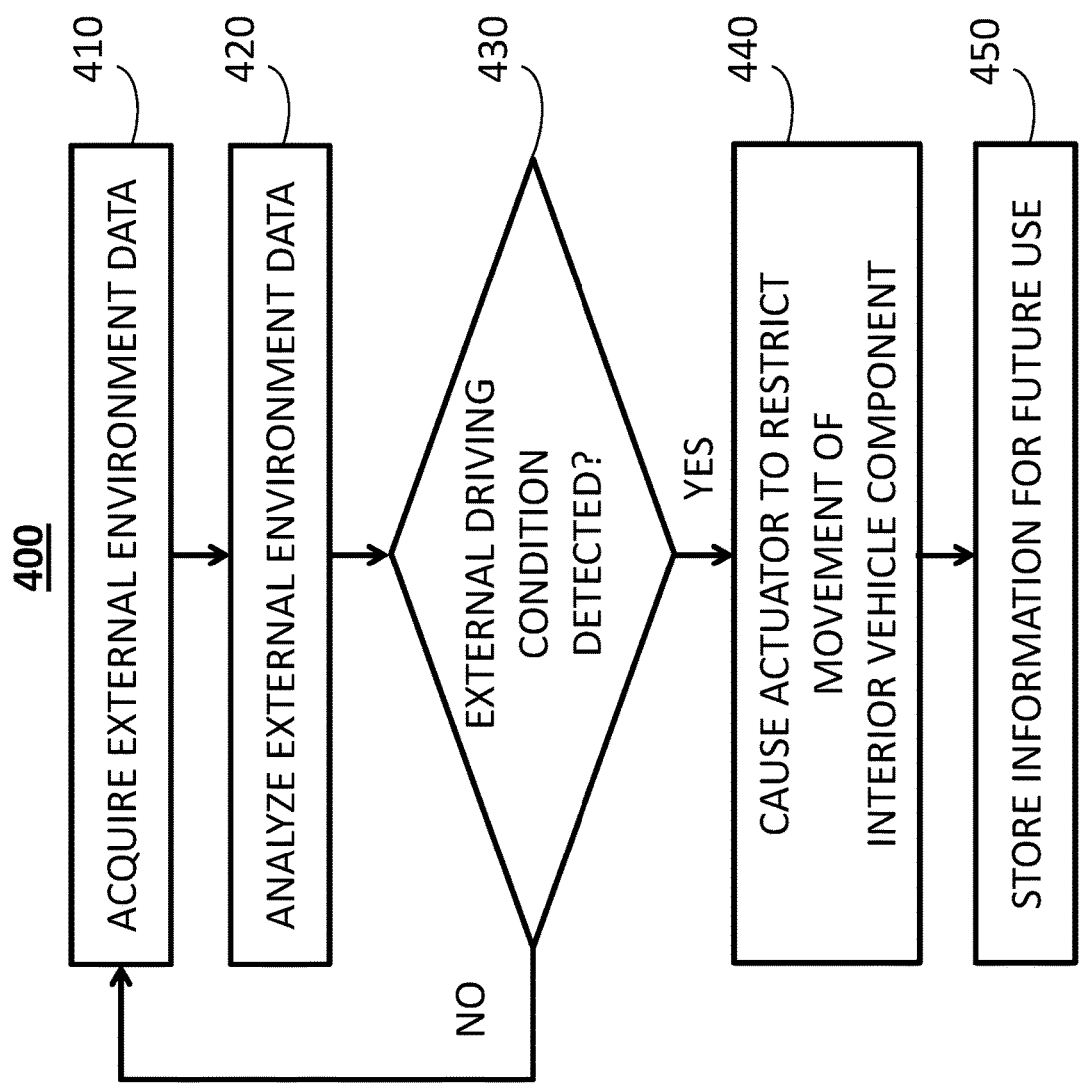
FIG. 4 illustrates a method for restricting the physical configuration of an interior vehicle component of a vehicle in response to a processor detecting an external driving condition.

FIG. 4 illustrates a method 400 for restricting the physical configuration of the interior vehicle component of a vehicle in response to the processor detecting an external driving condition. Steps 410, 420, 430, and 450 may be performed in the same manner as steps 310, 320, 330, and 360, respectively, of the method 300 as described with reference to FIG. 3, for example.

At step 440, in response to detecting the external driving condition, an actuator program, stored in an actuator program memory (for example the actuator program memory 232 of FIG. 1B), is executed to cause an actuator component (such as the actuator component 130 of FIG. 1A) to restrict the physical configuration of the interior vehicle component (such as the interior vehicle component 140 of FIG. 1A). The actuator program causes the interior vehicle component to be restricted to the current physical configuration or a range of physical configurations between two physical configurations. The range of physical configurations to which the actuator component may be adjusted may be stored in a data storage (such as the IVC configuration data storage 234 of FIG. 1B).

In some embodiments, restricting the physical configuration of the interior vehicle component is intended to reduce the risk of injury to a passenger riding in the vehicle. For example, when the external driving condition of an iced over road is detected, and the interior vehicle component is a passenger seat, a safer physical configuration of the passenger seat is determined based on the expected force and/or direction of force from skidding on the icy road. Accordingly, the passenger seat may have its configuration restricted from moving in order to prevent the passenger from being ejected from the seat or hitting a part of his/her body on something within the vehicle. In another example, in response to detecting that the vehicle is traveling on an icy road, the actuator component may restrict movement of the interior vehicle component as a precaution against a potential collision caused by the icy road conditions.

In another embodiment, if the interior vehicle component is a seatbelt, the seatbelt may be restricted from being disengaged to prevent a passenger from being ejected from the car upon impact.

After the actuator program has been executed to determine the range of physical configurations of the interior vehicle component, at step 450, the physical configuration of the interior vehicle component may be restricted to a physical configuration within this range of physical configurations. Conversely, in some embodiments, the interior vehicle component may be restricted to its current configuration to prevent movement of the interior vehicle component caused by the external driving condition.

Figure 5:
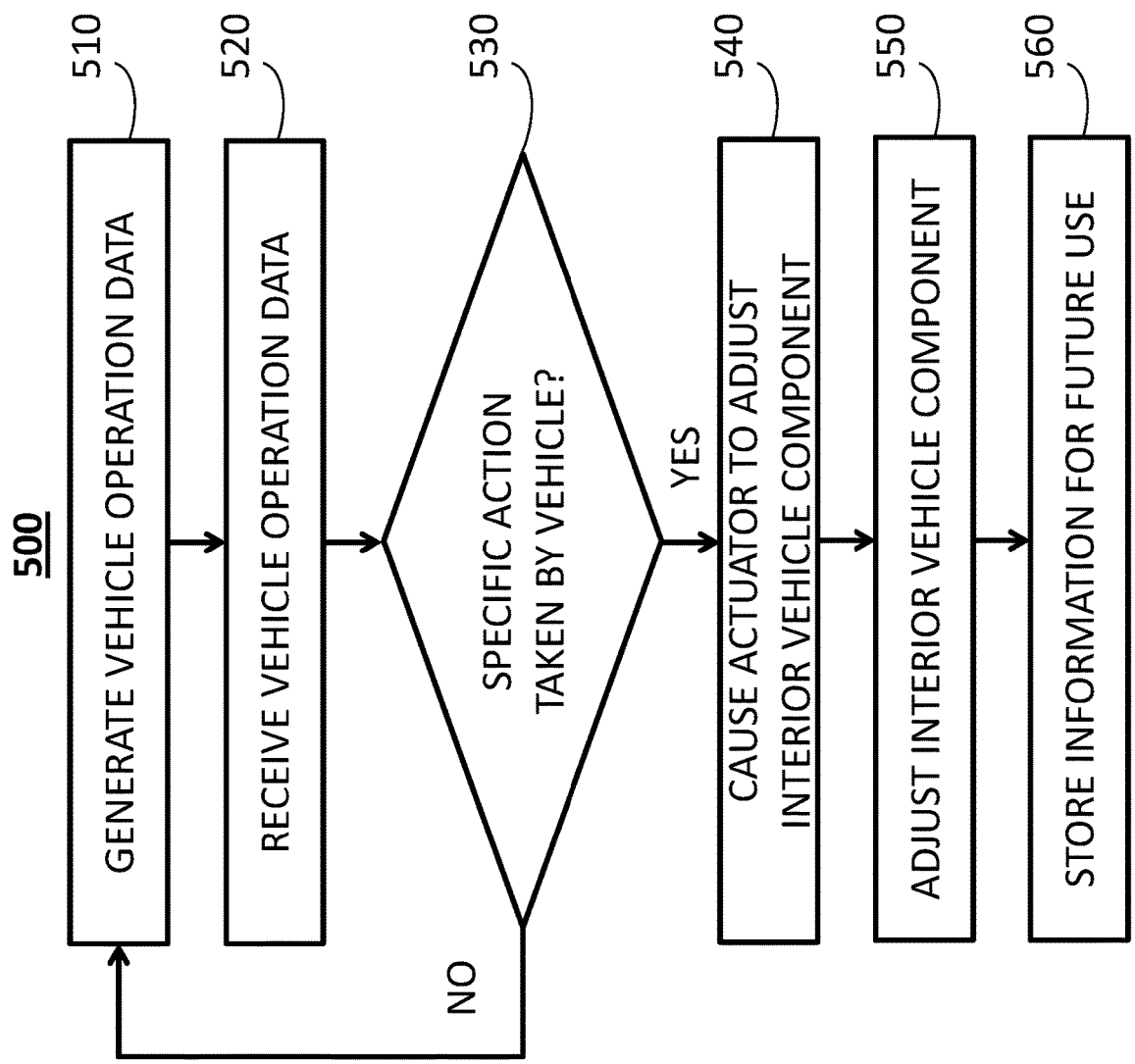
FIG. 5 illustrates a method for adjusting the physical configuration of an interior vehicle component of a vehicle in response to a processor detecting the vehicle has taken a specific action.

FIG. 5 illustrates a method 500 for adjusting the physical configuration of the interior vehicle component of a vehicle (e.g., the interior vehicle component 140 of the vehicle 102 in FIG. 1A) in response to a processor (e.g., processor 202 of FIG. 1B) detecting the vehicle 102 has taken a specific action. In some embodiments, the method 500 is a method for implementing an embodiment of the system 100 for controlling an interior vehicle component's functionality. For example, the method 500 may be implemented as described above in connection with FIGS. 1A and 1B. Accordingly, the method 500 may be partially or completely implemented on the vehicle computer 200.

At step 510, vehicle operation data representing the functional outputs of the vehicle is acquired. In some embodiments of the method 500, the vehicle operation data, which may include or otherwise be based on vehicle control data generated by the vehicle controller (e.g., the vehicle controller 150 of FIG. 1A), is transmitted to a vehicle computer (e.g. the vehicle computer 200 of FIGS. 1A and 1B) and stored in a data storage (e.g. the vehicle operation data storage 222).

In some embodiments, some or all of the vehicle operation data may also be transmitted to a third party over a network or server, such as to a server of an insurer (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze vehicle operation data and/or other data in accordance with any of the methods described herein. In some embodiments, the vehicle operation data may be used to adjust, generate, and/or update an insurance policy, premium, rate, discount, and/or reward for the specific driver, passenger, or the insured individual. In some embodiments, the vehicle operation data may be transmitted to other vehicles, for example as driving environment data as previously discussed, so that other vehicles may respond and react accordingly to the actions of the vehicle 102.

Next, at step 520, the vehicle operation data is analyzed (e.g., by a processor 202 of a vehicle computer 200 of FIG. 1B). In some embodiments, the vehicle operation data is analyzed in real-time to determine whether the vehicle has taken a specific action that may be hazardous to the safety of a passenger riding inside the vehicle. It should be understood that a vehicle "action" may comprise a single maneuver (e.g. accelerating, braking, turning the steering wheel, etc.), a combination of maneuvers (e.g. changing lanes—which entails a combination of changing speeds and turning, or changing lanes and then pulling onto a shoulder, etc.), an operational state (e.g. a speed of the vehicle, applying the brakes, etc.), or a change in operational state. In one embodiment, the vehicle operation data may be analyzed by comparing acquired vehicle operation data with data indicative of current environment driving conditions (such as a speed limit, weather conditions, road conditions, etc.), past driving environment conditions, past vehicle operation data, and/or other data relating to the operation of the vehicle. Examples of data relating to current environment driving conditions may include, but is not limited to, the presence of objects adjacent to or within the trajectory of the vehicle, current traffic conditions, current road conditions, current weather conditions, and/or any other data related to the current state of the driving environment external to the vehicle. Examples of data relating to past driving environment conditions may include, but is not limited to, previous driving behavior of a vehicle adjacent to the vehicle, past traffic conditions on the road the vehicle is traveling on, past road conditions, past weather conditions, and/or any other data related to the previous driving environment external to the vehicle. Past vehicle operation data may include data about past vehicle actions that are similar to the current vehicle actions and may further include data about conditions in the same or similar locations. In some embodiments, past vehicle operation data may include data related to the destination, planned route, preferred route, or predicted route of the vehicle.

For example, in furtherance of detecting whether the vehicle has entered a down-sloping road segment, analysis of the vehicle operation data (corresponding to parameters such as GPS location data, accelerometer data, vehicle speed data, etc.) may reveal that the vehicle has experienced a decrease in its vertical position above sea-level, an increase in speed, and/or a rapid change in accelerometer data; thereby indicating that the vehicle is exhibiting characteristics of entering a down-sloping road segment.

After analyzing the vehicle operation data, at step 520, a vehicle action detection program is executed to detect, based on the vehicle operation data, whether the vehicle has taken a specific action. The vehicle action detection program may be stored in a program memory (e.g., the vehicle action detection program memory 224). The detection of the vehicle taking a specific action may be determined by comparing the vehicle operation with a maximum or minimum criteria/threshold that is indicative of the point at which a specific vehicle action is detected. In some embodiments, the criteria/threshold indicative of the point at which a specific action is detected may be stored in a data storage (e.g. the vehicle action detection criteria data storage 226 of FIG. 1B). To detect the vehicle action, the vehicle operation data, or the value corresponding to the vehicle operation data, may need to be the same as, less than, or greater than the criteria/threshold. These thresholds may apply directly to the vehicle operation data, or may apply to a more advanced vehicle operation data analysis. For example, vehicle operation data corresponding to the vertical position of the vehicle may be analyzed to determine whether the vehicle has entered a downward-sloping road that could cause a passenger to feel uneasy/uncomfortable. In such an embodiment, the threshold for detecting the vehicle action may be exceeding a specific change in height in a certain amount of time, such as a 30-foot change in five seconds, and/or determining whether the speed of the vehicle has exceeded a certain value, such as 70 miles-per-hour.

Alternatively, in another embodiment, vehicle operation data may be used to calculate a value associated with the occurrence of the vehicle taking a specific action. In such an embodiment, the specific action may be detected when the calculated value is determined to exceed the predetermined threshold value. The determined value may reflect, for example, a predicted probability of a vehicle braking, accelerating, or turning, or an injury to a passenger traveling in the vehicle as a result of the vehicle taking a specific action. For example, in an embodiment in which the specific action is taking a sharp turn that may require adjusting a passenger seat to keep a passenger safe, vehicle operation data relating to a tire angle of the vehicle may be analyzed and assigned a single value (such as "30 degrees" for vehicle operation data indicative of a 30-degree angle of tire rotation). However, the detection of a sharp turn may only be detected if the determined value, based on the vehicle operation data, exceeds a threshold (such as a 40-degree angle).

While some embodiments of the method 500 have been discussed in terms of using individual thresholds to detect whether the vehicle has taken a specific action, it should be appreciated that detection of a specific action may entail the use of multiple thresholds, and/or machine learning (as discussed in further detail below). Further, an embodiment using more than one threshold may not require that every threshold be met to determine that the vehicle has taken a specific action. For example, to detect whether the vehicle is turning may require analyzing speed, braking, steering wheel rotation, tire angle, and/or or other vehicle operation/control data. In such an embodiment, the vehicle action of turning may be detected because vehicle operation data corresponding to the tire angle and steering wheel rotation exceeded thresholds, despite the vehicle speed or braking-related vehicle operation data not exceeding a threshold indicative of the vehicle turning.

When the vehicle action is not detected, then the method returns to step 510 to collect more vehicle operation data and repeats the method 500 as described above (e.g., on a periodic basis). However, when vehicle action is detected, then the method proceeds to step 540.

At step 540, in response to detecting the vehicle action, an actuator program, stored in an actuator program memory (e.g., the actuator program memory 232 of FIG. 1B), is executed to cause an actuator component (such as the actuator component 130 of FIG. 1A) to adjust the physical configuration of the interior vehicle component (e.g., the interior vehicle component 140 of FIG. 1A). The actuator program causes the interior vehicle component to be adjusted to a second physical configuration. The second physical configuration of the interior vehicle component may correspond to data stored in a data storage unit (e.g., the IVC configuration data storage 234 of FIG. 1B).

In some embodiments, adjusting the physical configuration of the interior vehicle component from a first physical configuration to the second physical configuration is intended to reduce the risk of injury to a passenger riding in the vehicle. For example, if the vehicle action of the vehicle braking is detected and the interior vehicle component is a passenger seat, it may be determined that the passenger seat should be adjusted backward to minimize and/or counteract the force exerted on the passenger resulting from the vehicle braking. Accordingly, the passenger seat may have its configuration adjusted backward to a position that reduces the effects of whiplash on a passenger. In a similar example, in response to detecting the vehicle action of a sharp turn, a passenger seat may be adjusted to a second physical configuration, which tilts in the direction opposite of the turn in order to prevent a passenger from being jolted.

In some embodiments, passenger data, collected by an interior data collection component (such as the interior data collection component 120 of FIG. 1A) and stored in a data storage (such as the passenger profile data storage 238 of FIG. 1B), may also be used to determine the second physical configuration of the interior vehicle component. For example, if a passenger is pregnant, the information may be factored into determining how/where to cause the actuator component to adjust the interior vehicle component because certain movements (such as rapid or sharp movements) and/or configurations (such as a configuration that puts pressure on the passenger's stomach) may be detrimental to the pregnant passenger and/or her child's wellbeing.

Similarly, for example, if a passenger has a back injury/condition, moving the interior vehicle component to a certain configuration may cause the passenger discomfort and/or may further aggravate the condition. Therefore, this passenger information may be considered in determining how to adjust the interior vehicle component.

After the actuator program has been executed to determine the second physical configuration of the interior vehicle component, then at step 550, the physical configuration of the interior vehicle component may be adjusted from the first physical configuration to the second physical configuration.

Some embodiments of the method 500 may include step 560, at which information received, generated, calculated, detected, and/or determined during the method 500 may be stored for future use. Stored information may include, but is not limited to, the vehicle operation data received at step 510, the vehicle action detected at step 530, and/or the second physical configuration determined at step 540. Storing this information for future use may be used to improve the accuracy and speed of analyzing vehicle operation data, detecting a vehicle action, training machine learning models which may be used for detecting the specific vehicle action, determining an optimal interior vehicle component physical configuration, and/or adjusting the interior vehicle component. This recorded information may be stored locally in the vehicle computer and/or may be transmitted to a third party machine (e.g., if a driver has expressly agreed to participate in a program involving data collection/sharing). In some embodiments, the recorded information may be used to adjust, generate, or update an insurance policy, premium, rate, discount, and/or reward for the specific driver, passenger, or the insured individual.

Figure 6:
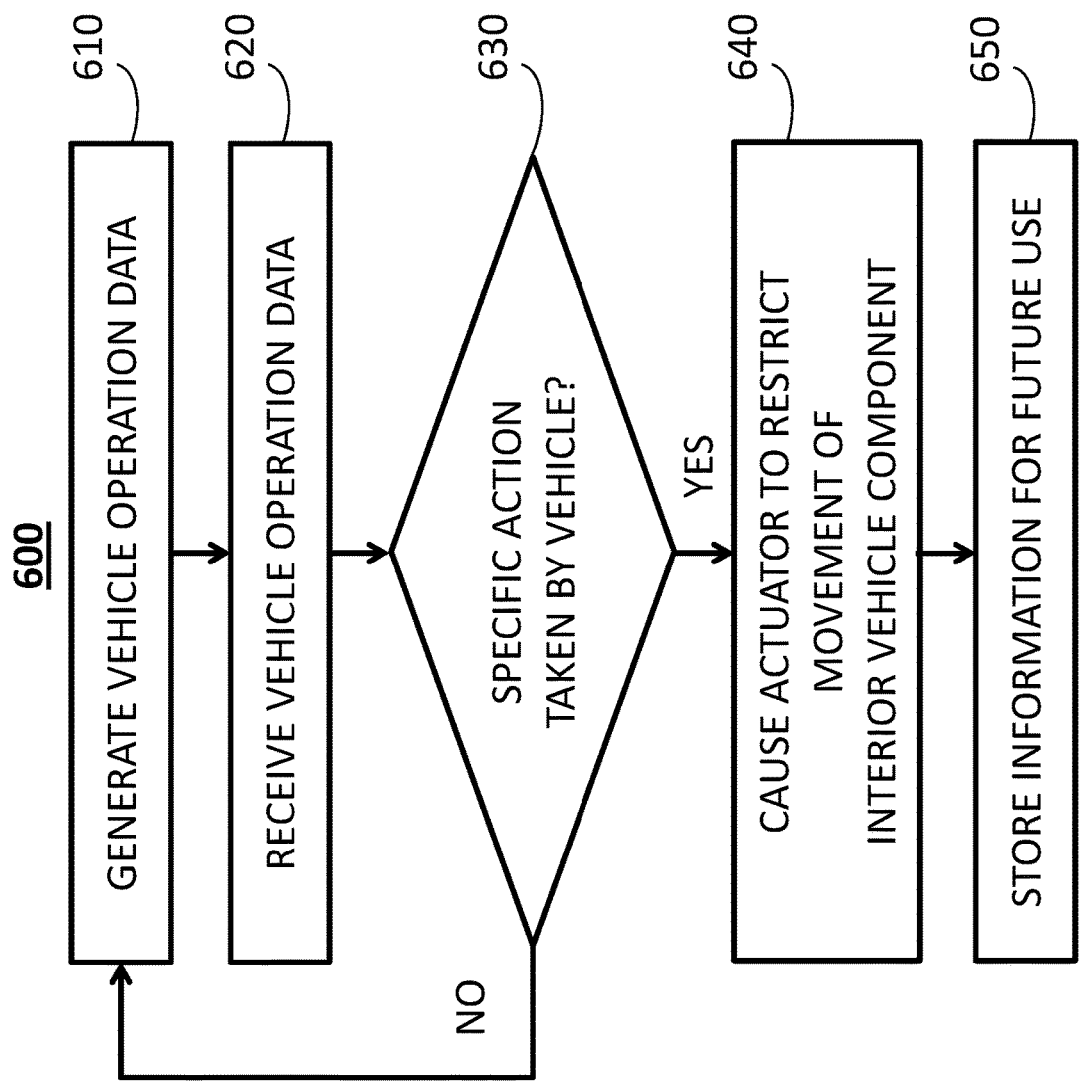
FIG. 6 illustrates a method for restricting the physical configuration of an interior vehicle component of a vehicle in response to a processor detecting the vehicle has taken a specific action.

FIG. 6 illustrates a method 600 for restricting the physical configuration of the interior vehicle component of a vehicle in response to the processor detecting the vehicle has taken a specific action. Steps 610, 620, 630, and 650 may be performed in the same manner as steps 510, 520, 530, and 560, respectively, of the method 500 as described with reference to FIG. 5, for example.

At step 640, the processor executes the actuator program, stored in an actuator program memory 232, to cause an actuator component 130 to restrict movement of the interior vehicle component to a range of physical configurations, or to the current physical configuration, in response detecting the vehicle has taken a specific action. The range of physical configurations to which the actuator component may be adjusted may be stored in the IVC configuration data storage 234. In some embodiments, restricting movement of the physical configuration of the interior vehicle component is intended to reduce the risk of injury to a passenger riding in the vehicle. For example, if the processor determines that the vehicle is braking, and the interior vehicle is a passenger seat, the processor determines a physical configuration for the passenger seat that protects the passenger from sustaining an injury resulting from the vehicle braking. Accordingly, the passenger seat may have its configuration restricting from moving in order to prevent the passenger from being ejected from the seat or hitting a body part on something within the vehicle. In another embodiment, if the interior vehicle component is a seatbelt, for example, the seatbelt may be restricted to its current physical configuration from being disengaged to prevent a passenger from being ejected from the car upon impact.

Once the processor executes the actuator program to determine the range of physical configurations of the interior vehicle component, then at step 640, the processor 202 may restrict the actuator component from adjusting the physical configuration of the interior vehicle outside this range of physical configurations. Conversely, in other embodiments, at step 640, the processor may restrict the actuator component from adjusting the physical configuration of interior vehicle component, and thus the interior vehicle component is confined to its current physical configuration.

In some embodiments, multiple interior vehicle components are adjusted in response to the processor detecting an external driving condition and/or specific action. In some embodiments the adjusted interior vehicle components are different types of elements. For example, in one embodiment, in response to detecting an external driving condition such as an impending collision, the processor may cause a first actuator component to adjust the physical configuration of a passenger's seat and cause a second actuator component to close a window in anticipation of the collision. In another example, in response to detecting an external driving condition such as rain, the processor may cause a first actuator to close a sunroof, a second actuator component to close a window, and a third actuator component to adjust the physical configuration of a passenger seat in anticipation of potential vehicle skidding caused by a slick road.

For scenarios in which multiple passengers are traveling in the vehicle, it should be appreciated that each passenger may have his/her own dedicated interior vehicle component. It should also be appreciated that each interior vehicle component may be adjusted, or have its movement restricted, in the same, substantially similar, or different manner (and/or to the same or similar physical configuration) as other interior vehicle components of like kind. Further, the processor may take into account the existence of other passengers and/or interior vehicle components in the vehicle when determining the second physical configuration of each of the interior vehicle component. For example, in an embodiment in which two passengers are traveling in the vehicle and each passenger is seated in a separate seat (the interior vehicle component), when the processor detects an external driving condition or a specific action, the processor may consider the physical configuration of both passengers' seats (and/or external conditions) before adjusting either seat in order to avoid harming either passenger. Thus, for example, when the processor determines the vehicle is set to collide head-on with another vehicle, both seats may be adjusted backward and/or rotated away from the collision point to minimize injury to both passengers. As another example, in an embodiment in which the processor determines that an another vehicle is going to T-bone the left side of the vehicle, the processor may cause the actuator component to move the left passenger seat backwards/forward because moving the left passenger seat laterally to the right is not possible due to a second passenger being seated on the right side of the vehicle in a passenger seat.

In some embodiments, the external driving condition and/or specific vehicle action may be detected using machine learning techniques, such as cognitive learning, deep learning, combined learning, heuristic engines and algorithms, and/or pattern recognition techniques. For example, the processor 202 may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

In some embodiments, machine learning techniques may also, or instead, be utilized to determine when the existence of an external driving condition and/or specific vehicle action is sufficiently hazardous to warrant adjusting or restricting the movement the physical configuration of the interior vehicle component, and/or to determine the best manner in which to adjust or restrict the physical configuration. In such embodiments, the driving environment data and/or vehicle operation data may be considered in combination with each other and/or passenger data to evaluate whether the risk warrants adjusting or restricting the physical configuration of the interior vehicle component.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processor (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also predict which vehicles are more prone to be classified as a total loss in the event of a vehicle collision, such as by vehicle characteristics determined from vehicle or other data.

The processing element and/or machine learning algorithm may determine historical storage, rental, or salvage time and/or costs typically expected with various types of vehicles or with vehicles having specific characteristics (such as make, model, mileage, age, etc.)—such as by analysis of scrubbed or depersonalized historical or past auto claim data. As such, a total loss may be predicted when a given vehicle is involved in a vehicle collision, and if so, the total loss cycle time may be reduced, and inconvenience to the insured may be reduced.

Additional Considerations

Unless specifically stated otherwise, discussions herein using words such as "processing," "computing," "calculating," "determining," "detecting," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers.

What is claimed:

1. A system for controlling an interior configuration of a vehicle, the system comprising:
   an interior vehicle component, wherein the interior vehicle component includes one or more of: a steering wheel, a mirror, window, a door, a hardtop convertible roof, a soft-top convertible roof, a floor panel, a visor, a partition, a sunroof, a sky roof, a storage module, a beverage holder, a foot rest, a bed, a seatbelt, a desk, or a work surface;
   an actuator component configured to adjust a physical configuration of the interior vehicle component;
   an external communication component including (i) a transceiver configured to communicate with an external source to collect data representing an external environment of the vehicle and (ii) a microphone configured to collect data representing a recognized weather condition; and
   one or more processors configured to:
      receive driving environment data that includes, or is derived from data that includes the data collected by the external communication component,
      adjust a threshold that is indicative of detecting an external driving condition based on the driving environment data,
      determine an exposure risk to an external driving condition based on a road area indicated in the driving environment data,
      detect an external driving condition based on the driving environment data, the threshold, and the exposure risk, and
      when the one or more processors detect the external driving condition, cause the actuator component to adjust the interior vehicle component from a first physical configuration to a second physical configuration.

2. The system of claim 1, wherein:
   the external communication component further includes a sensor interface configured to collect sensor data from one or more sensors positioned on or in the vehicle; and
   the driving environment data includes, or is derived from data that includes the sensor data.

3. The system of claim 1, wherein the external driving condition is an impending collision between the vehicle and one or more objects external to the vehicle.

4. The system of claim 3, wherein the one or more processors are configured to:
   detect the impending collision at least by (i) determining a closing speed between the vehicle and the one or more objects external to the vehicle and (ii) determining a distance between the vehicle and the one or more objects.

5. The system of claim 3, wherein the one or more processors are configured to:
   detect the impending collision at least by determining a predicted trajectory of the vehicle and a predicted trajectory of the one or more objects external to the vehicle.

6. The system of claim 1, wherein the external communication component includes another transceiver configured to collect data from one or more sources separate from and external to the vehicle.

7. The system of claim 1, wherein the external driving condition is at least one of a particular type of vehicle traffic, a particular type of weather, a terrain condition, a construction condition, a road integrity condition, or a vehicle speed limit.

8. The system of claim 1, wherein the actuator component is configured to adjust the interior vehicle component from the first physical configuration to the second physical configuration at least by moving the interior vehicle component in at least one of a forward, backward, upward, downward, clockwise, counterclockwise, or lateral direction relative to the vehicle.

9. The system of claim 1, further comprising:
   a second interior vehicle component;
   a second actuator component configured to adjust a physical configuration of the second interior vehicle component; and
   wherein the one or more processors cause the second actuator component to adjust the second interior vehicle component from a third physical configuration to a fourth physical configuration when the one or more processors detect the external driving condition.

10. The system of claim 1, wherein the one or more processors are further configured to:
    receive passenger data that is generated by, or is derived from data generated by, one or more passenger sensors positioned in the vehicle; and
    determine, by processing the passenger data, the second physical configuration of the interior vehicle component.

11. The system of claim 1, wherein the external source comprises at least one of a smart vehicle, a public transportation system, a smart train, a bus, a plane, or an aerial drone.

12. The system of claim 1, wherein the road area indicated in the driving environment data comprises an indication of at least one of a time when the road area is historically hazardous, whether or not the road area is associated with a higher-than-average number of traffic conditions, or whether or not the road area is associated with a higher-than-average number of collision-causing hazards.

13. The system of claim 1, wherein the one or more processors are further configured to:
    determine a threshold value corresponding to whether or not the external driving condition exists based on at least one of a distance between the vehicle and one or more objects external to the vehicle, a weather condition of the external environment, a traffic condition of the external environment, or a road condition of the external environment; and
    determine a likelihood value corresponding to whether or not the external driving condition exists based on the driving environment data and the exposure risk.

14. The system of claim 1, wherein the one or more processors are further configured to:
    determine historical storage, rental, or salvage costs associated with the vehicle based on vehicle characteristics of the vehicle; and
    when the one or more processors detect the external driving condition, determine a loss value corresponding to the vehicle as a result of the external driving condition based on the historical storage, rental, or salvage costs associated with the vehicle.

15. A method for controlling an interior configuration of a vehicle, comprising:
- receiving, via one or more processors, driving environment data that is generated by, or derived from data generated by an external communication component, the external communication component having (i) a transceiver to obtain a first portion of the driving environment data from an external source and (ii) a microphone configured to collect a second portion of the driving environment data representing a recognized weather condition;
- adjusting, via the one or more processors, a threshold that is indicative of detecting an external driving condition based on the driving environment data;
- determining, via the one or more processors, an exposure risk to an external driving condition based on a road area indicated in the driving environment data;
- detecting, by the one or more processors based on the driving environment data, the threshold, and the exposure risk, an external driving condition; and
- causing, via an actuator component, an interior vehicle component to adjust from a first physical configuration to a second physical configuration when the one or more processors detect the external driving condition, wherein the interior vehicle component includes one or more of: a steering wheel, a mirror, window, a door, a hardtop convertible roof, a soft-top convertible roof, a floor panel, a visor, a partition, a sunroof, a sky roof, a storage module, a beverage holder, a foot rest, a bed, a seatbelt, a desk, or a work surface.

16. The method of claim 15, wherein:
- the external communication component further includes a sensor interface configured to collect sensor data from one or more sensors positioned on or in the vehicle; and
- the driving environment data includes, or is derived from data that includes the sensor data.

17. The method of claim 15, wherein the external driving condition is an impending collision between the vehicle and one or more objects external to the vehicle.

18. The method of claim 17, wherein the one or more processors are configured to:
- detect the impending collision at least by (i) determining a closing speed between the vehicle and the one or more objects external to the vehicle and (ii) determining a distance between the vehicle and the one or more objects.

19. The method of claim 18, wherein the one or more processors are configured to:
- detect the impending collision at least by determining a predicted trajectory of the vehicle and a predicted trajectory of the one or more objects external to the vehicle.

20. The method of claim 15, wherein the external communication component includes another transceiver configured to collect data from one or more sources separate from and external to the vehicle.

21. The method of claim 15, wherein the actuator component is configured to adjust the interior vehicle component from the first physical configuration to the second physical configuration at least by moving the interior vehicle component in at least one of a forward, backward, upward, downward, clockwise, counterclockwise, or lateral direction relative to the vehicle.

22. The method of claim 15 further comprising:
- receiving, via the one or more processors, passenger data that is generated by, or derived from data generated by, one or more passenger sensors positioned in the vehicle;
- determining, by processing the passenger data using the one or more processors, the second physical configuration of the interior vehicle component.

23. The method of claim 15, wherein the external source comprises at least one of a smart vehicle, a public transportation system, a smart train, a bus, a plane, or an aerial drone.

24. The method of claim 15, wherein the road area indicated in the driving environment data comprises an indication of at least one of a time when the road area is historically hazardous, whether or not the road area is associated with a higher-than-average number of traffic conditions, or whether or not the road area is associated with a higher-than-average number of collision-causing hazards.

25. The method of claim 15, wherein detecting the external driving condition further comprises:
- determining, via the one or more processors, a threshold value corresponding to whether or not the external driving condition exists based on at least one of a distance between the vehicle and one or more objects external to the vehicle, a weather condition of an external environment, a traffic condition of the external environment, or a road condition of an external environment; and
- determining, via the one or more processors, a likelihood value corresponding to whether or not the external driving condition exists based on the driving environment data and the exposure risk.

26. The method of claim 15, further comprising:
- determine historical storage, rental, or salvage costs associated with the vehicle based on vehicle characteristics of the vehicle; and
- responsive to detecting the external driving condition, determining, by the one or more processors, a loss value corresponding to the vehicle as a result of the external driving condition based on the historical storage, rental, or salvage costs associated with the vehicle.

* * * * *

UNITED STATES PATENT AND TRADEMARK OFFICE
CERTIFICATE OF CORRECTION

| | |
|---|---|
| PATENT NO. | : 11,400,834 B2 |
| APPLICATION NO. | : 15/887307 |
| DATED | : August 2, 2022 |
| INVENTOR(S) | : Brian Mark Fields et al. |

Page 1 of 1

It is certified that error appears in the above-identified patent and that said Letters Patent is hereby corrected as shown below:

In the Claims

At Column 38, Line 37, "an" should be -- the --.

Signed and Sealed this
Eighteenth Day of July, 2023

Katherine Kelly Vidal
*Director of the United States Patent and Trademark Office*